United States Patent [19]

Keeney et al.

[11] Patent Number: 4,932,022
[45] Date of Patent: Jun. 5, 1990

[54] INTEGRATED VOICE AND DATA TELEPHONE SYSTEM

[75] Inventors: Clare G. Keeney, Campbell; Gary L. Passon, Los Gatos; Ronald J. Hagen, Livermore; Chris D. Foster; Frank J. Fritsch, both of Sunnyvale, all of Calif.

[73] Assignee: Telenova, Inc., Los Gatos, Calif.

[21] Appl. No.: 326,405

[22] Filed: Mar. 20, 1989

Related U.S. Application Data

[63] Continuation of Ser. No. 107,863, Oct. 7, 1987, abandoned, which is a continuation of Ser. No. 675,422, Nov. 27, 1984, abandoned.

[51] Int. Cl.⁵ .............................................. H04J 3/24
[52] U.S. Cl. ..................................... 370/60; 370/94.1; 379/96; 379/165
[58] Field of Search ......................... 370/94, 60, 85, 76; 379/96, 354, 440, 201, 165

[56] References Cited

U.S. PATENT DOCUMENTS

| | | | |
|---|---|---|---|
| 4,291,198 | 9/1981 | Anderson et al. | 179/2 DP |
| 4,425,627 | 1/1984 | Eibner | 379/96 |
| 4,449,218 | 5/1984 | Strehl | 370/76 |
| 4,535,448 | 8/1985 | Baxter et al. | 370/85 |
| 4,631,364 | 12/1986 | Coyne et al. | 379/165 |

OTHER PUBLICATIONS

Hagelbarger et al., "Experimental Teleterminals—Hardware", *Bell System Technical Journal*, Jan. 1983, vol. 62, No. 1, pp. 145–152.

Bayer et al.; "Experimental Teleterminal—The Software Strategy", *Bell System Technical Journal*, Jan. 1983, vol. 62, No. 1, pp. 120–144.

Krepick, William, "Smart Phones Aren't Coming—They're Here", *Telephony*, Feb. 26, 1979, pp. 45–52.

Adkins et al., "Disphlaphone: Telephone and Terminal", *Bell Northern Research*, 1982.

*Primary Examiner*—Douglas W. Olms
*Assistant Examiner*—Curtis Kuntz
*Attorney, Agent, or Firm*—Flehr, Hohbach, Test, Albritton & Herbert

[57] ABSTRACT

An integrated voice and data telephone system is disclosed. The invention provides a telephone-based integrated voice, data and application communication system for small businesses. The system includes a plurality of telephone station sets which provide a user with a softkey selectible menu-driven interactive display to enable any one of a plurality of voice and/or data functions.

14 Claims, 25 Drawing Sheets

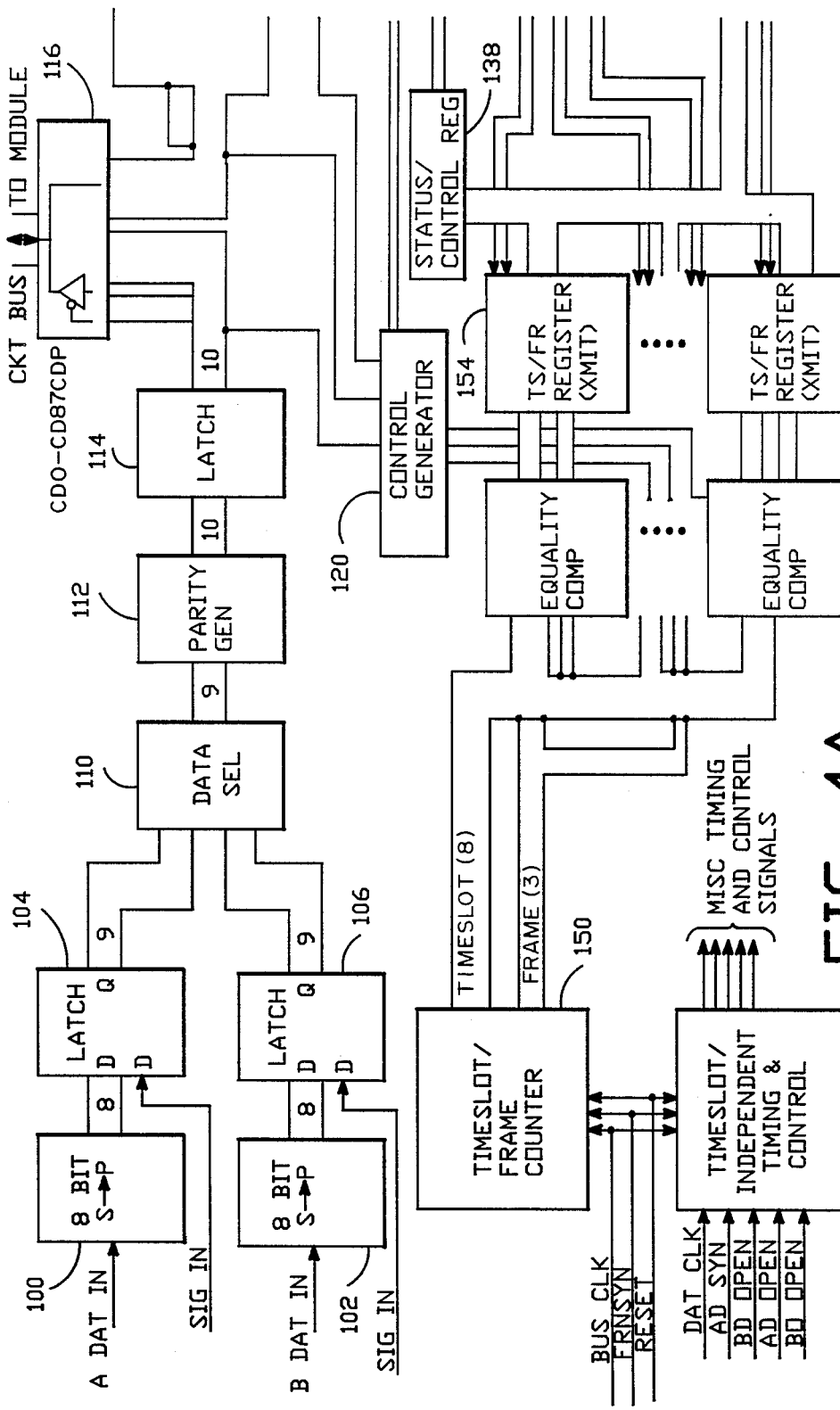

NOTE 1: ENABLE + CLOCK POLARITIES SHOWN FOR STATION SET INSTALLATION (ENAPOL LOW)

$t_{cc} = 2\ t_{mc}$, / where $t_{mc}$ is the master clock period $t_{cce}$ = 0 nS min
100 nS max $t_{ccd}$ = 0 nS min
100 nS max $t_{edc}$ = -50 nS min
+50 nS max

INTEGRATED VOICE AND DATA TELEPHONE SYSTEM

This is a continuation of application Ser. No. 107,863 filed Oct. 7, 1987.

BACKGROUND OF THE INVENTION

The present ivention relates to a integrated voice and data telephone system for use in a business environment. Communications are undergoing rapid and dramatic change with the incorporation of display terminals, personal computers, and word processors. The computer controlled systems require, in general, processing of data in digital format, as contrasted to conventional telephone systems which operate in an analog or analog-to-digital format. Consequently, one problem which has faced business communication systems is the incorporation of data and voice inforamtion into a compatible fashion.

Due to the different technical needs and standards of voice and data communication, their integration has proven to be fairly difficult. Computer manufacturers have developed local area networks (LANs) to allow computers and peripheral devices to communicate with one another. While there have been attempts to broaden LAN systems by adding voice capability, the results have been less than satisfactory. It is believed that there presently are not existing provisions to link LAN voice channels to public telephone networks.

In addition, voice transmission qualtiy generally is substandard in LAN systems. Similarly, PBX manufacturers attempting to add data to their digital voice switches also have fallen short. In both cases, integrating data and voice usually has involved compromises of existing design philosophies, with results which have often been clumsy and in general always costly.

The difficulties appear to have stemmed from designers who seemed compelled to base their designs on the architectural concepts of existing systems, either because those were the concepts as understood or in order to protect compatability with an older equipment base. Predictably, the results have been unsatisfactory.

SUMMARY OF THE INVENTION

It is an object of the present invention to provide an improved business communications system.

It is another object of the present invention to provide an improved integrated voice and data telephone system.

A more particular object of the present invention is to provide integration of voice and data communications which employs a distributed architecture scheme.

In particular, an object of the present invention is to provide an improved telephone station set which provides compact and efficient interaction of voice, data and messages for a user. These capabilities include interactive messaging, access to personnel directories, the ability to handle both voice and data traffic simultaneously, full choice of call routing, user administration of features and the like.

The telephone station set is connected to a pair of telephone subscriber lines for transmitting and receiving voice and data information on those subscriber lines. The telephone station set provides the capability of converting analog voice information to a digital format and includes a two-line by forty character interactive liquid crystal display which guides a user with an orderly flow of information, on-call status, prompts, menus, caller identity, a speed dialing directory and messages, depending on the need at any particular moment.

The menu driven displays are softkey selectible so that a plurality of changeable menu functions can be displayed on an as-needed basis. The telephone station set is responsive to a selected one of the displayed menu functions for enabling that selected menu function, such as indicated above. Functions or commands which are invalid at the moment are not presented as a choice or selection, thus reducing the possibility of user error.

Other objects, advantages and novel features of the present invention will be set forth in part in the description which follows, and in part will become apparent to those skilled in the art upon examination of the following or may be learned by practice of the invention. The objects, features and advantages of the invention may be realized and attained by means of the instrumentalities and combinations particularly pointed out in the appended claims.

DESCRIPTION OF THE DRAWINGS

Figure 1A:
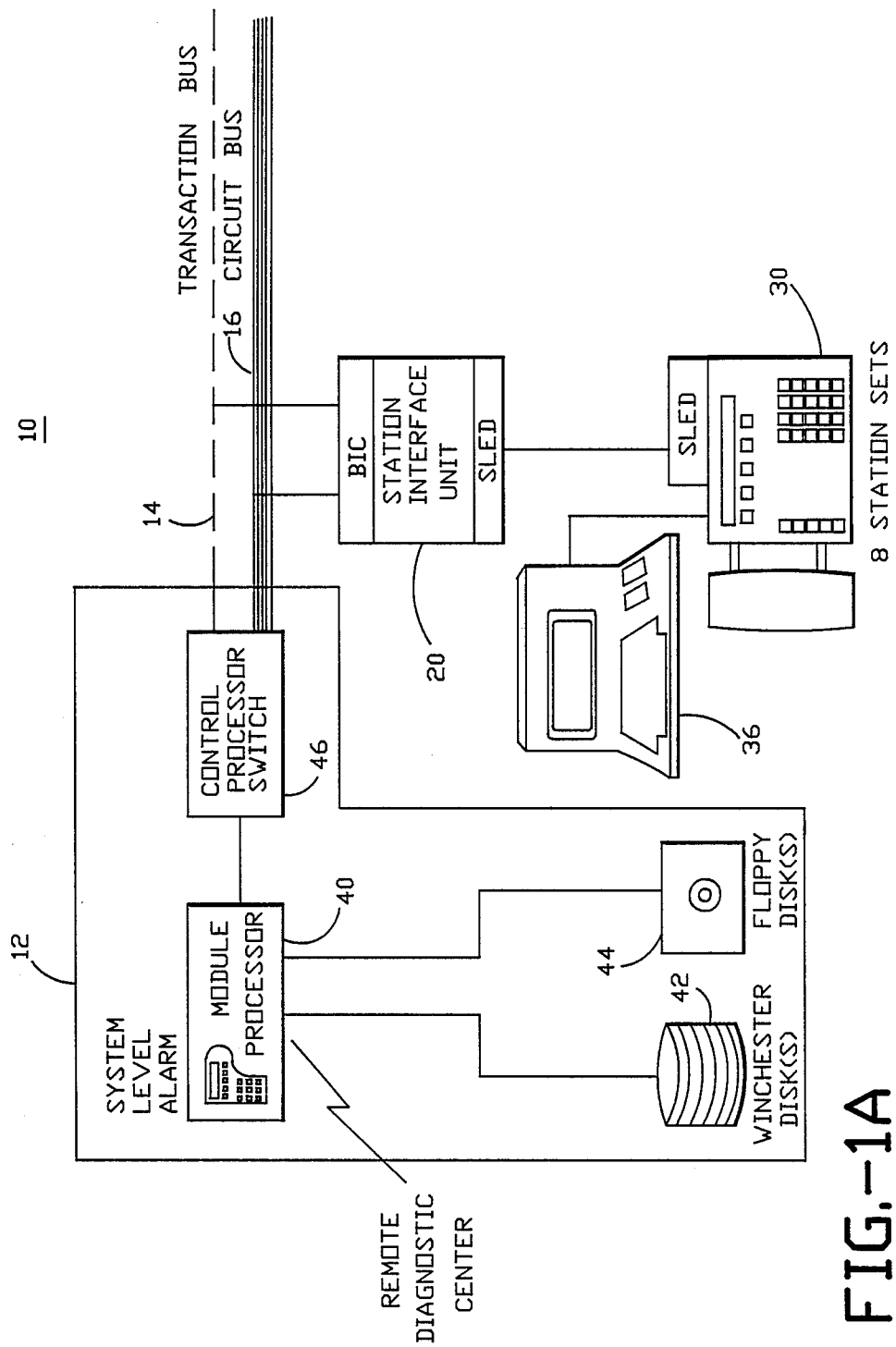
FIG. 1A depicts a block diagram of an expanded version of the present invention.
Figure 1B:
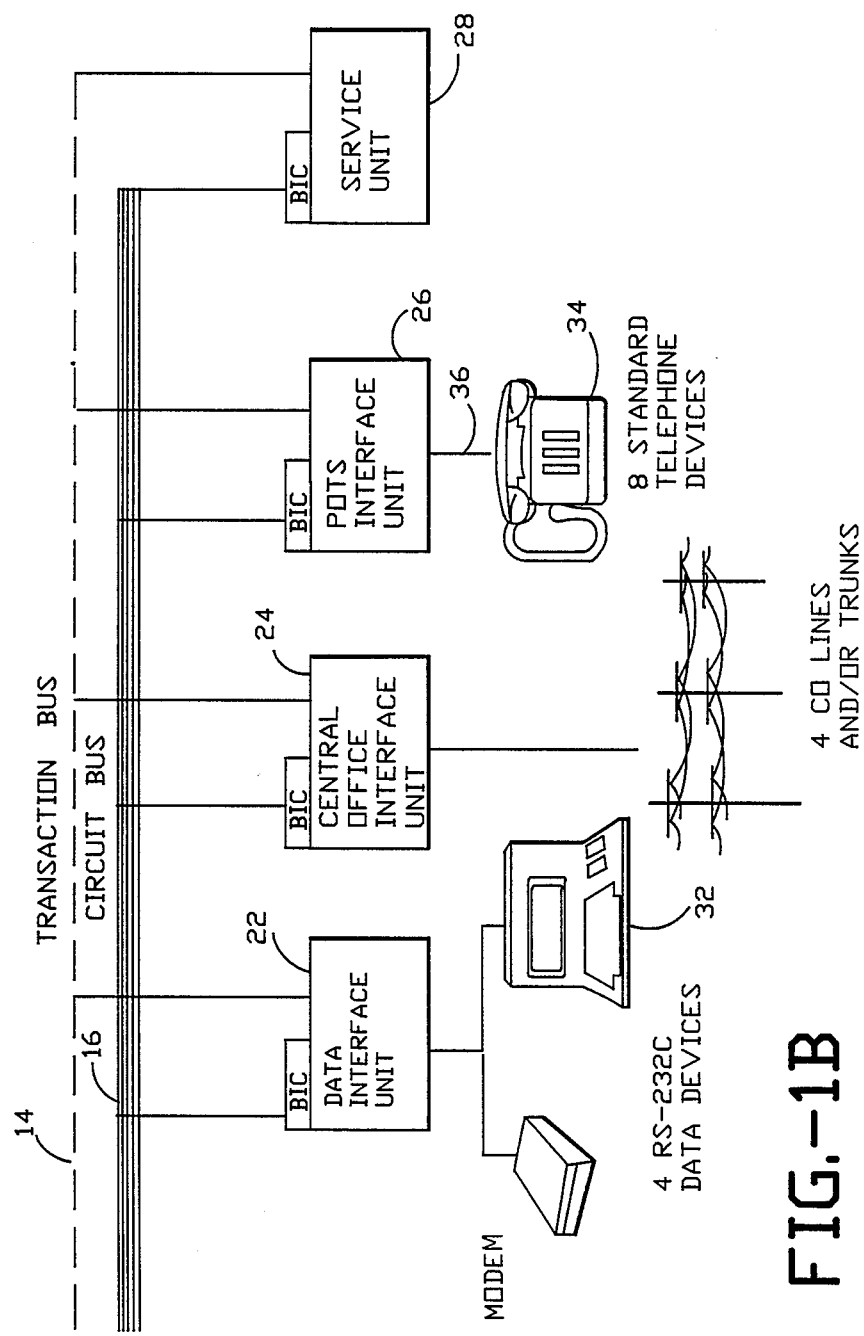
FIG. 1 depicts a block diagram of the present invention.
Figure 1C:
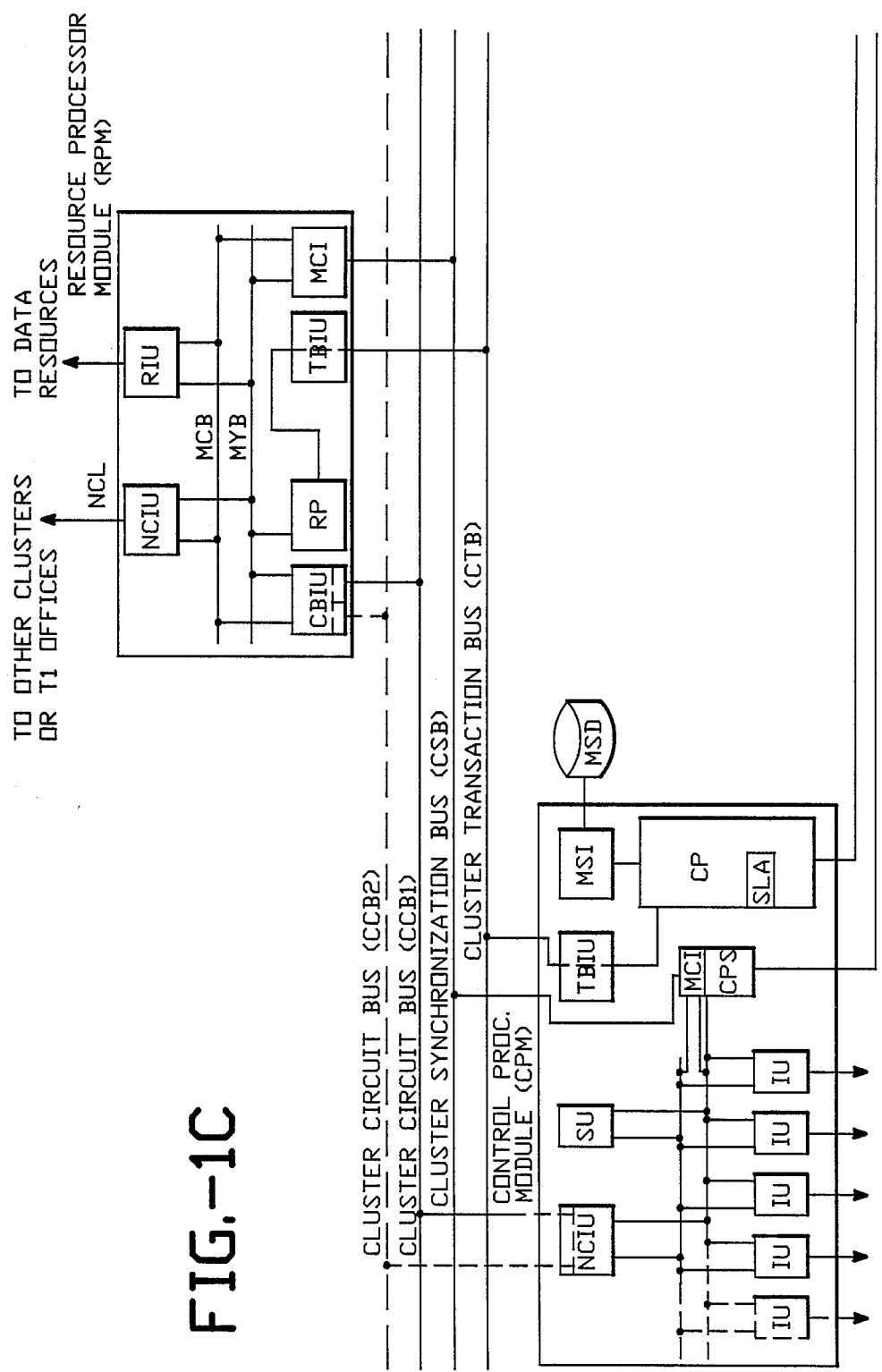
Figure 1D:
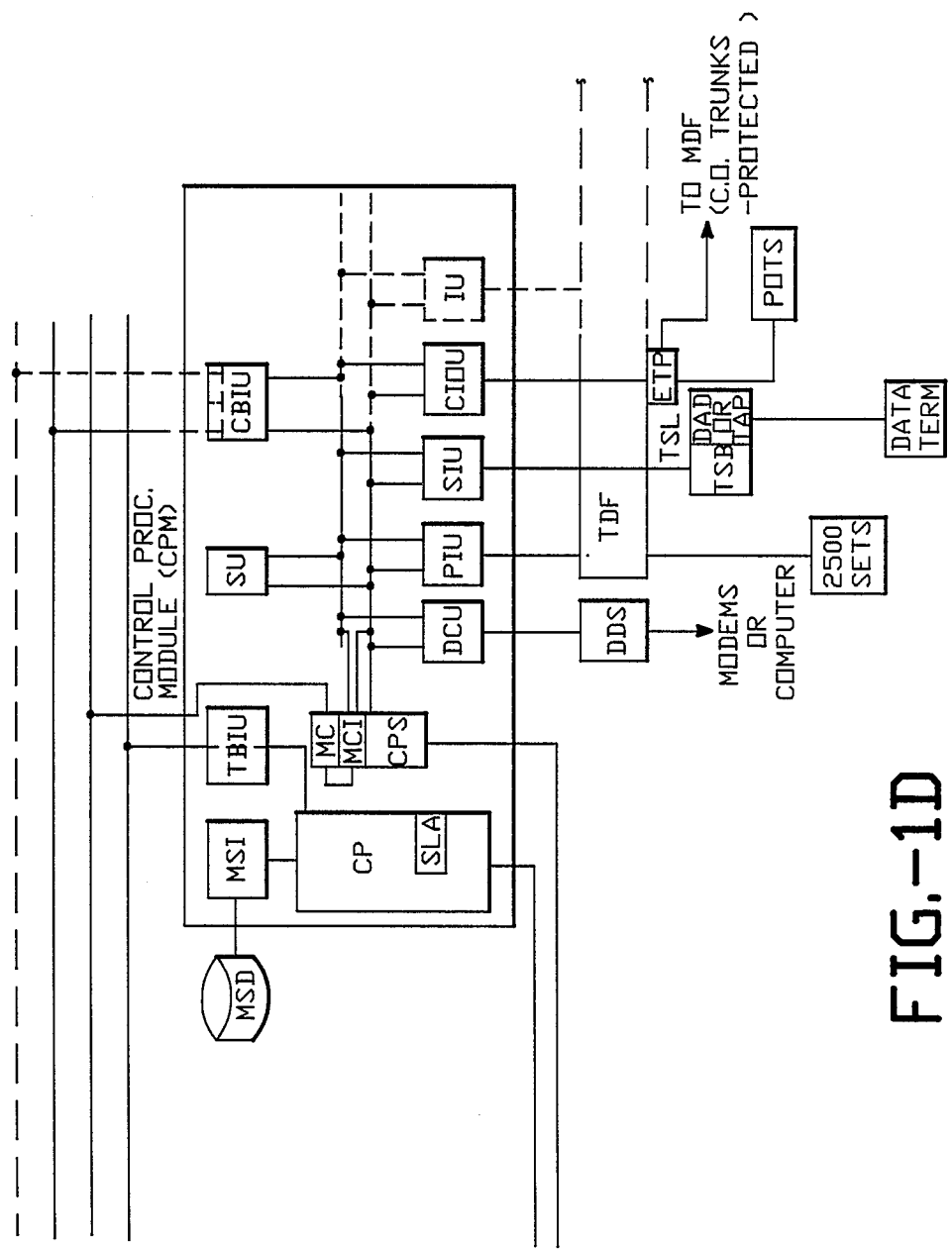

Referring now to FIG. 1, a block diagram of one embodiment of the present invention is illustrated therein. The design of the improved business communications system reflects a new architectural approach that contrasts with the conventional designs of most PBXs and local area networks (LANs). Rather than relying on a central call processor to oversee or perform every operating detail in the system, the present invention incorporates a strongly hierahical approach. The control module includes the central processor, mass storage devices, and control processor switch. It also contains 18 slots for any mix of interface units (IU's) which provide connection to the Central Office trunks, several kinds of station instruments and a variety of data devices.

This distribution of responsibility has facilitated fast system development and a superior diagnostics and maintenance capability. Because of the architectural approach, the system offers inherent versatility and long-term potential for expansion.

As shown in FIG. 1, the basic system 10 comprises a central module 12 linked over two separate high-speed buses 14, 16 to a series of specialized interface units (IU's) 20–28. The IUs are circuit cards that interpret and pass on command messages between the Module 12 and lower level devices and facilities, such as telephone stations sets, computers and outside trunks. The interface units of FIG. 1 are described below.

The Station Interface Unit (SIU) 20 serves up to eight Telephone Station Sets 30. SIU 20 provides eight voice ports and, with the addition of a Data Adapter Device inside each Station Set, eight asynchronous RS-232C data ports.

The Data Interface Unit (DIU) 22 permits use of up to four stand-alone RS-232C devices (such as computer 32, a printer, a digital facsimile machine or modem) without associated voice facilities. In one embodiment, data rates up to 19.2 kilobits per second (kb/s) asynchronous are supported.

The Central Office Interface Unit (COIU) 24 serves any mix of up to four incoming, outgoing or two-way central office loop-start lines or ground-start trunks.

Each Pair Interface Unit 26 provides eight voice ports for conventional rotary-dial and pushbutton telephones, such as telephone 34, over single-pair station wire 36. This unit also provides interfaces with any or all of the many devices such as answering machines or alarm systems which connect with telephone lines.

Other IUs (not shown in FIG. 1) could interface with LANs, T1 Pulse Code Modulation (PCM) trunks, video transmission facilities, Circuit, Switched Digital Circuits (CSDC), and packetswitched networks such as X.25 and others.

In FIG. 1, Module 12 incorporates an 8086-based processor 40 and, in one embodiment, up to 16 megabytes (MB) of random access memory (RAM). As little as 0.5 MB of RAM is possible, but small installations typically would employ about 1 MB.

In one embodiment, the Module 12 also houses a 5 MB Winchester-type hard disk drive 42 for mass storage of various system data such as call processing software, diagnostics, directories, specialized applications, features, and the like (up to 300 MB of mass storage is possible in other embodiments). In addition to the hard disk storage, a 360 kilobyte floppy disk drive 44 is provided for convenient loading of new software, such as program upgrades or new feature sets. The disk drives can be purchased with more capacity in the same physical sizes and with the same electronic interfaces.

The Module 12 provides a circuit bus 16 with 256 Time Division Multiplexed (TDM) time slots with which it can provide full duplex, non-blocked service up to 120 physical ports. A port here is defined as a station with the potential of both voice and data, a CO trunk or other physical wired input. The physical housing of the Moduole 12 provides 18 card slots into which the IUs and a service unit card 28 are mounted in any combination. The module will accommodate 256 logical ports in a non-blocking mode. A logical port is a voice or data input from a TSS, a CO trunk, a DIU data input, a POTS phone input or a SU tone, for example.

The service unit 28 supplies digital tones and ringing signals for the local stations as well as conference and maintenance capabilities. The actual number of ports which can be served by a single module depends on the mix of IUs employed in each configuration, i.e., the mix of central office trunks, data terminals, Station Sets, modems and the like. Module Control Processor Switch 46 provides the system for adding a redundant Module Processor in other applications.

The internal backbone of the system 10 is a very flexible circuit bus 16 with dynamically allocated bandwidth totaling 18 megabits per second (Mb/s). As an example, time slots on this bus may be allocated from 256 to 2000 in number. The minimum time slot element of 9 kb/s includes one 8-kb/s digital channel plus one 1-kb/s in-band supervisory channel, so that a dual-dynamic bus allocation capability is provided. For voice circuits, a 72-kb/s bandwidth is assigned and composed of eight of these 9-kb/s channels. Since each 9-kb channel is built up out of an 8-kb digital channel and a 1-kb supervisory channel, the North American and ISDN standards of 64 kb/s are embedded.

For data and other formation services (e.g., video), as little as one 9-kb channel and as much bandwidth as the service requrires may be dynamically assigned limited only by the total 18 Mb/s bandwidth of the circuit bus 16.

The transaction bus 14 of FIG. 1 transmits control messages in packet-type format between the Module 12 and the various IUs. Each packet message at the NOS level is labeled with the name of its addressee, which may be located anywhere in the system 10. This tenchnique gives the system 10 immense flexibility and frees it of constraints imposed by any particular configuration.

Typical examples of transaction messages include the equivalent of: "Seize an outgoing WATS trunk and dial this telephone number...," and "Put this tone out and write this message on the display." Each message is sent in an efficient packet format including the destination name, the message or command and a checksum. The bandwidth of transaction bus 14 is 670 kilobytes per second, which assures ample capacity for a avoiding delays in call set-up or message passing, even in very busy systems.

In FIG. 1, each of the IUs (except the SIU 20) contain its own 8085 processor which receives and implements commands or queries from the Module processor 40 and originates messages of its own to the Module processor 40.

The SIU 20 does not require its own processor because it interfaces with up to eight Telephone Station Sets 30, each having its own 8085 processor, and in addition a second 8048 microprocessor when equipped with a Data Adapter Device. These 8085's manage the communications protocol, the display and the keyboard; the 8048 manages data transmission between the station processor and circuit bus subsystem via the SLED.

The SIU 20 serves primarily as an interface between the system buses 14, 16 and the station wiring over which it transmits and receives a continuous 256 kb/s full duplex stream up to a distance of one-half mile. This includes 72 kb/s each for data and voice, plus 16 kb/s for control, supervision and display messages. The excess bandwidth of the station data stream over what is currently required by a station for voice, data and control, represents a reserve that is available for additional enhancements or special applications.

A gate array chip, the Station Link Encoder-Decoder (SLED) is located in each SIU 20 and Station Set 30. The SLED chip packages the digital voice, data and control bit stream for transmission over the station wiring at 256 kb/s. A second chip is resident on each IU of FIG. 1. This chip is the Bus Interface Circuit (BIC) and controls communication between the IU and the Circuit Bus 16. These large scale integrated (LSI) chips replace a large number of discrete components and allow both the system cost and size to remain small. Both the SLED and BIC chips will be described in more detail below. The BIC will be described in conjunction with FIGS. 4-7 and the SLED will be described in conjunction with FIGS. 8-10.

Referring now to FIg. 1A, there is depicted therein a block diagram of a business communication system (BCS) which illustrates in more detail the functional interconnections of a control processor module (CPM).

In general, an interface unit (IU) connects to the telephone station set (TSS), a pair interface unit (PIU), a data interface unit (DIU), or central office interface unit (COIU), as illustrated in FIG. 1.

The system illustrated in block diagram form in FIG. 1A is provided as a further aid in illustrating the aspects of the present invention. For simplicity, a mnemonic table is set forth below to provide an indication of the various acronums illustrated in FIG. 1A.

of the TSS 30 combined with its unusual versatility and intuitive ease of use encourage its use without requiring that novice users be trained or keep reference material on hand, e.g., lists of speed dial numbers or keystroke protocols for invoking features. This aspect serves as a mental reminder of choices currently at hand. Furthermore, the display provides an English language display as contrasted with current codes, such as "#", "*" and the like.

Figure 2:
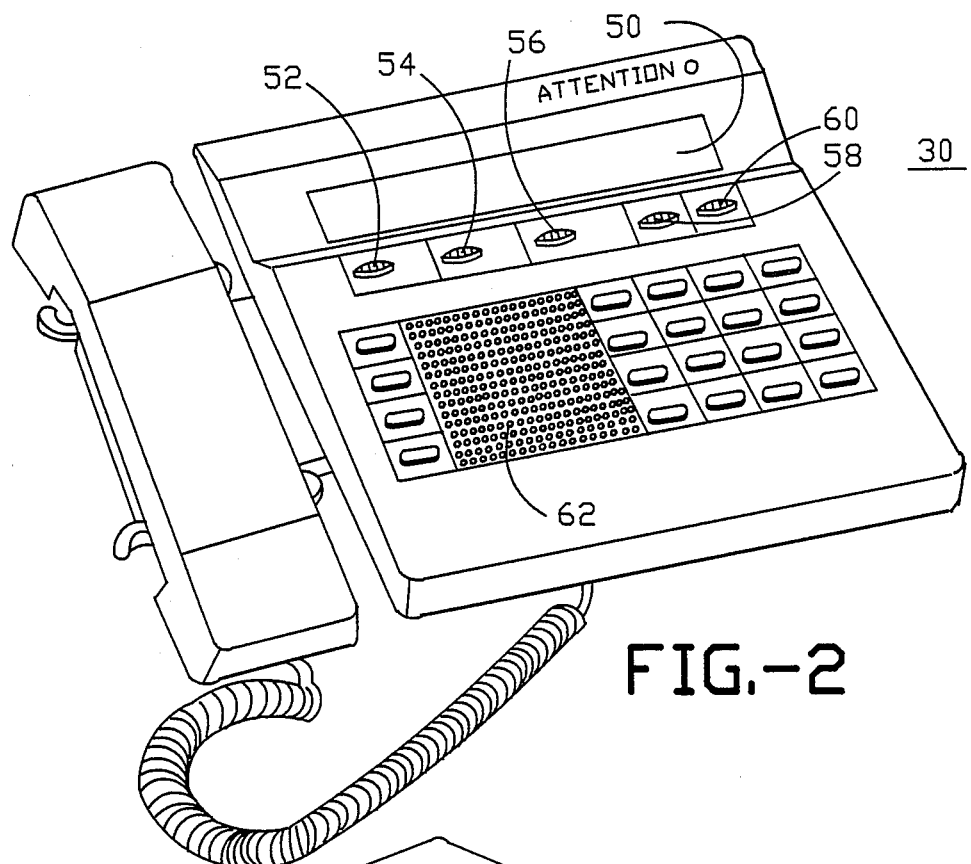
FIG. 2 depicts a perspective view of a telephone station set, which forms a part of FIG. 1.
Figure 3:
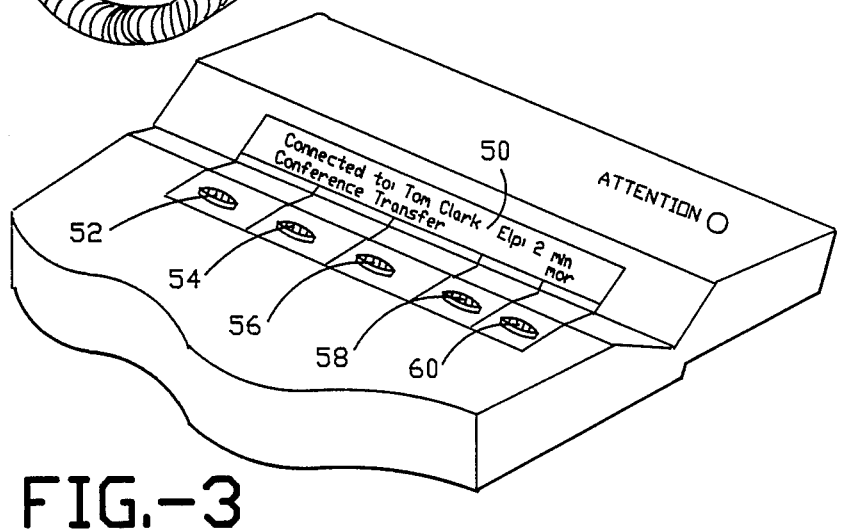
FIG. 3 depicts a more detailed view of the telephone station set of FIG. 2, illustrating the liquid crystal display and softkeys.

FIG. 3 depicts a more detailed view of the TSS 30 of FIG. 2. In FIG. 3, an illustration of one aspect of the invention is depicted wherein a telephone call could be set up as a conference call by pressing softkey 52, or in the alternative, the call could be transferred by pressing softkey 54.

The TSS 30 of FIGS. 2 and 3 incorporates a North American standard mu-law codec to digitally encode analog speech signals into standard PCM format. Up to 24 KB of memory (RAM and ROM) are included within the set for local features.

The TSS 30 may contain an optional RS-232C port which allows terminals personal computers (such as computer 36 of FIG. 1) and the like to be connected to the station and become part of the system. This capability is obtained by the addition of the Data Adapter Device (DAD), a small printed circuit board within the TSS 30. The DAD communications through the SLED with the 256 kb/s data stream over the two-pair station wiring.

The TSS of FIGS. 2 and 3 also incorporates a speakerphone 62 and controls for adjusting the viewing angle

TABLE

| MNEMONIC TABLE | | GENERAL: "IU" REPRESENTS INTERFACE UNIT | |
|---|---|---|---|
| CBIU | CIRCUIT BUS IU | MTB | MODULE TRANSACTION BUS |
| CCB | CLUSTER CIRCUIT BUS | NCIU | NETWORK COMMUNICATION IU |
| COIU | CENTRAL OFFICE IU | NCL | NETWORK COMMUNICATION LINK |
| CP | CONTROL PROCESSOR | PIU | POTS IU |
| CPM | CONTROL PROCESSOR MODULE | RIU | RESOURCE IU |
| CPS | CONTROL PROCESSOR SWITCH | RP | RESOURCE PROCESSOR |
| CTB | CLUSTER TRANSACTION BUS | RPM | RESOURCE PROCESSOR MODULE |
| DAD | DATA ADAPTOR DEVICE | SLA | SYSTEM LEVEL ALARM |
| DDF | DATA DISTRIBUTION FRAME | SIU | STATION IU |
| DIU | DATA IU | SU | SERVICE UNIT |
| ETP | EMERGENCY TELEPHONE PROTECTION | TAP | TSS APPLICATION PROCESSOR |
| MC | MASTER CLOCK | TBIU | TRANSACTION BUS IU |
| MCB | MODULE CIRCUIT BUS | TDF | TELENOVA DISTRIBUTION FRAME |
| MDF | MAIN DISTRIBUTION FRAME | TSS | TELENOVA STATION SET |
| MSD | MASS STORAGE DEVICE | UPS | UNINTERRUPTABLE POWER SUPPLY |
| MSI | MASS STORAGE INTERFACE | POTS | PLAIN OLD TELEPHONE SET |
| CSB | CLUSTER SYNCHRONIZATION BUS | TSL | TELENOVA STATION LINK |
| MCI | MASTER CLOCK INTERFACE | | |

Referring again to FIG. 1, the Telephone Station Set (TSS) 30 is a simple and compact user terminal which provides many functional capabilities. A perspective view of an improved telephone station set 30 is illustrated in FIG. 2. Unlike some other highly features terminals, the TSS 30 in FIG. 2 has relatively few keys—25—, but commands all the capabilities for which other station sets require 40 to 60 keys or even more.

It achieves this efficiency by using a 40-character by two-line liquid crystal display 50 to provide menu selection of features, prompts and appropriates options on each call. It also identifies internal calls by caller's name, incoming calls, trunk facilities employed, and directory information. In FIG. 2, each of five "soft" keys 52, 54, 56, 58, 60 are labeled with the functions currently assigned to them at each stage of a call. Messages, prompts and menu selection are transmitted to each TSS 30 from Module 12 via the transaction packet channel bus 14 of FIG. 1. The unintimidating simplicity of the LCD 50 and the volume settings of the ringer and speakerphone.

Figure 4B:
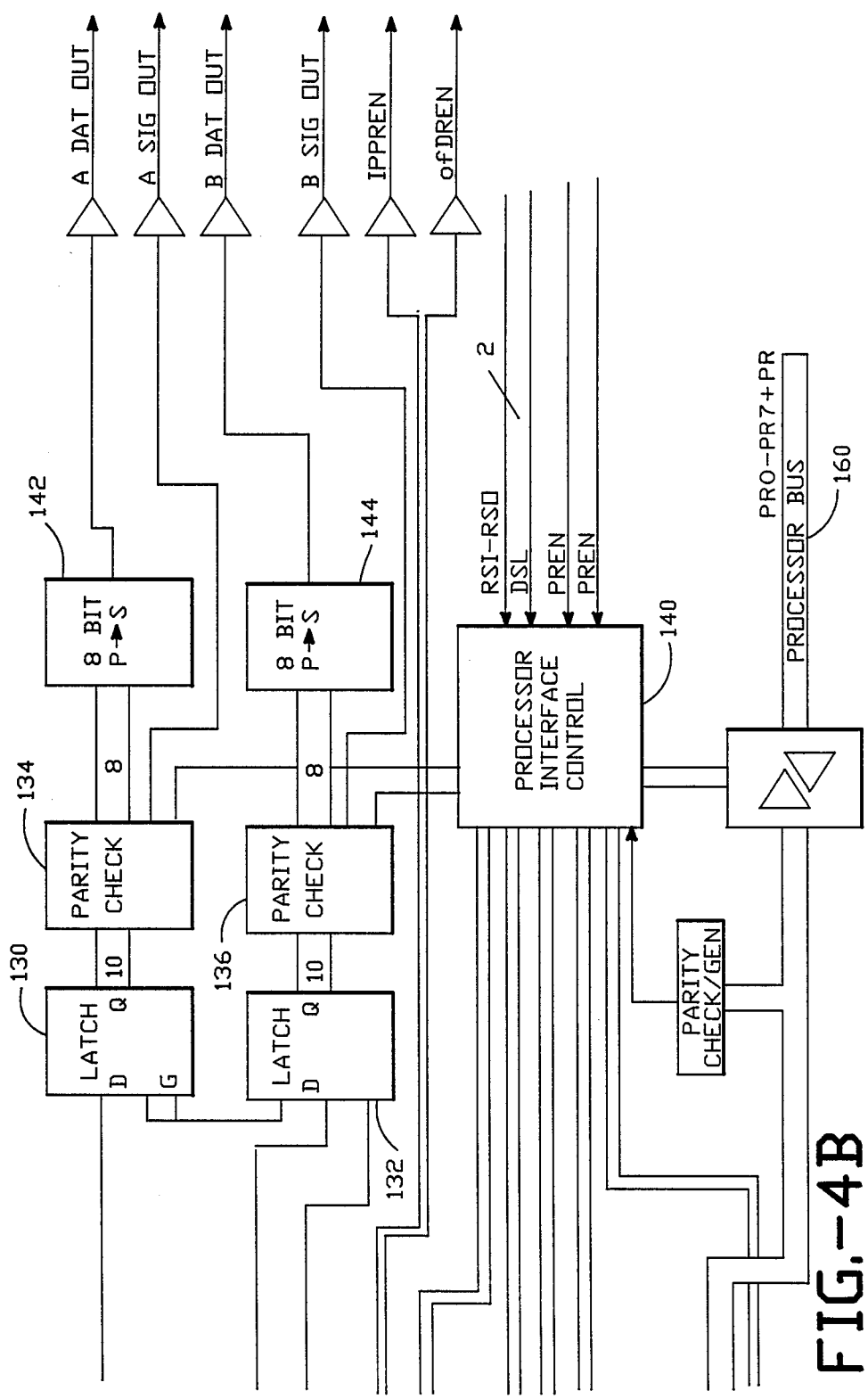
FIG. 4 depicts a block diagram of a bus interface chip, which forms a portion of FIG. 1.

Referring now to FIG. 4, a block diagram of the bus interface chip (BIC) is depicted. The BIC of FIG. 4 will now be described in conjunction with the timing diagrams illustrated in FIG. 5-7. The bus interface chip (BIC) provides an interface between two serial I/O lines and a parallel, timeslotted module bus. The BIC is a high performance CMOS semi-custom gate array.

The BIC is utilized on all BUS IUs. It is designed to be particulary efficient interfacing to a Station Link Encoder-Decoder (SLED, to be described later), but is also useful for interfacing virtually any type of IU to the module circuit bus 16.

The functions performed by the BIC could be performed by discrete LSTTL logic. The advantages of using a gate array instead are lower cost in high production volumes, less physical size, lower power, less heat, and improved reliability through decreased parts count.

Semi-custom gate arrays are CMOS LSI devices with between 500 and 10,000 uncommitted gates on an unmetalized water. Customizing involves creating the metalization layer or layers in order to define the specific function of the device. For conceptual purposes, the device can be looked upon as a "board" of conventional TTL devices condensed to a single chip. The only devices which must still be provided off-chip are drivers and buffers which provide board I/Os; conventional LSTTL devices in these applications are considerably more robust against transients and static discharge.

The BIC illustrated in FIG. 4 replaces most of the digital circuitry on a typical IU. It interfaces between a station link encoder-decoder on a station IU, or two codecs on a POTS/CC IU, and the module bus. Two serial input channels and two serial output channels are provided which can send or receive on any of 256 timeslots of a 10 bit wide parallel bus. A processor interface is provided to allow the module processor to control timeslot selection, commands, and status information to and from the BIC.

Referring to FIG. 4, two channels of serial input data enter two serial to parallel converters 100, 102. Data is clocked into both inputs on the rising edge of a common data clock. Separate eneable inputs define the period of the eight valid data bits. Data may be clocked in a virtually any rate between 64 KHz and 2 MHz providing that the entire new 8 bit word is ready before frame sync.

The ninth "signaling" bit enters separately, and is strobed into one of two latches 104, 106, simultaneously with the first bit of serial data per frame.

A data selector 110 chooses one of the two latch outputs which will apply data to the bus during the next timeslot.

Parity is generated by parity generator 112 on the combination of the eight bit parallel data and the signaling data. Frame sync causes the parallel data, the signalling bit data, and the parity bit to be latched in latch 114.

The latch outputs are connected to bidirectional output drivers 116, which place the latched data on to the output pins of the device when enabled by the control generator circuit 120 (to be described later).

Two 10 bit latches 130, 132 can sample data from the device's circuit bus pins. Again, the control circuit 120 issues enable signals during the appropriate time slots to latch the correct data.

Parity is checked on the received data by parity check circuits 134, 136. A signal is sent to the status/control register 130 and the processor interface and control 140 if there is a received parity error.

At frame sync, the parallel data latched during the previous frame is loaded into the parallel to serial converters 142, 144. Using the same data clock as the input registers and separate data enables, the converters 142,144 output two serial data channels. Signaling bits are latched at the beginning of each data enable so that new signaling information is available concurrently with the new data.

For testing purposes, the processor can command the loopback circuit to attach the serial output to the serial input. When the timeslot registers are correctly set, this causes data received on one timeslot to be placed back on another timeslot.

Two major categories of control signals are generated. The first are independent of the timeslots which are being read or written. These are generally dependent on frame sync and are used to move data between latches and the serial-parallel interfaces. The second are those which enable latches or buffers during a particular timeslot and frame. The specific timeslot and frame are under the control of an external processor via a set of registers which it loads with the appropriate timeslot/frame information.

A counter 150 keeps track of the current timeslot and frame, and a set of comparators checks the counter output versus each register's contents. When the current timeslot/frame matches that loaded into a register, the appropriate control signal is invoked.

Either of the two channels can be set up to send and receive on any timeslot pair. To facilitate lower rate data subchannels, data can be sent on any combination of frames within the superframe. The receiver, however, is always enabled on all frames of the superframe for a given timeslot.

The reset input is a special control signal which sets the BIC to a known state. With a reset input, all error registers are cleared and the transmit submux registers are cleared so that no data will be placed on the parallel circuit bus.

Still referring to FIG. 4, the processor interface 140 allows loading of any of the timeslot/frame registers via an 8 bit processor I/O bus 160. Data formats are specified below.

When timeslot/frame registers 154 are loaded, the actual information is not transferred to the registers until a control register is loaded by processor 140. Loading will be arbitrated by processor interface control 140 relative to framesync and the bus clock to insure that the enabling or disabling of a timeslot/frame combination will not result in glitches on either the parallel or serial outputs.

If a parity error is detected from the processor during a write of the control register, the information in the timeslot and frame holding registers 154 will not be transferred to the actual timeslot and frame registers when the control register is loaded. An error bit will be set in the status register, and the write inhibit circuit will be cleared so that a subsequent write of the control register with correct parity will occur normally. Parity errors received in loading the time-slot and frame holding register pair will only be evidenced by the processor write error bit in the status register being set.

The inputs and outputs to and from the BIC will now be described. Inputs and outputs to the BIC of FIG. 4 are standard EIA/JEDEC format for CMOS industry B specifications at Vdd=5 V.

The following table below lists the input signals of FIG. 4.

TABLE I

| Sig Name | Signal Description |
| --- | --- |
| ADATIN | Serial data input, channel A |
| ASIGIN | Signal (ninth) bit input, channel A |
| ADINEN | Input enable, channel A |
| ADOPEN | Output enable, channel A |
| BDATIN | Serial data input, channel B |
| BSIGIN | Signal (ninth) bit input, channel B |
| BDINEN | Input enable, channel B |
| BDOPEN | Output enable, channel B |
| DATCLK | Data i/o clock, ch A & b |
| BUSCLK | Module bus clock, 4.096 MHz. |
| FRMSYN | Module bus frame sync. |
| RS1-RS0 | Register address 0-3. |

TABLE I-continued

| Sig Name | Signal Description |
|---|---|
| DSL | Device processor select, select low. |
| PREN | Processor read enable, enable low. |
| PWEN | Processor write enable, enable low. |
| RESETL | BIC reset. |

Table II below lists the bidirectional (I/O) signals.

TABLE II

| Sig name | Signal Description |
|---|---|
| CDC — CDB + CCP | Module circuit bus (10 lines) |
| PDC — PD7 + PDP | Processor data bus (9 lines) |

Table III below lists the output signals.

TABLE III

| Sig name | Signal Description |
|---|---|
| ADATOUT | Serial data output, ch A |
| ASIGOUT | Signal bit output, ch A |
| BDATOUT | Serial data output, ch B |
| BSIGOUT | Signal bit output, ch B |
| OPDREN | Output driver enable low |
| IPDREN | Input driver enable low |

Figure 5:
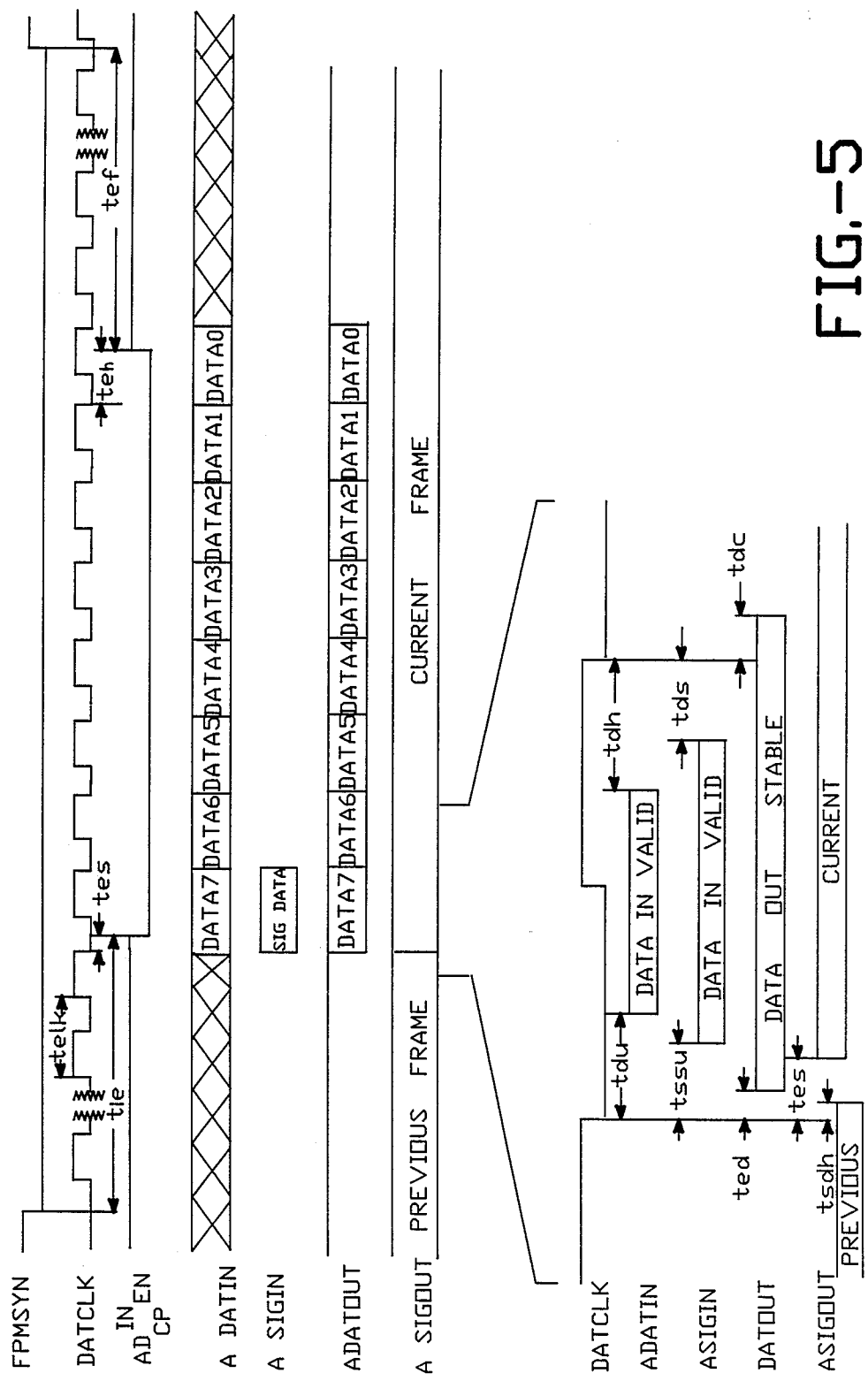
FIGS. 5–7 depict timing diagrams for the bus interface chip of FIG. 4.

Timing requirements for input signals and timing specifications for output signals from the BIC of FIG. 4 will be described in conjunction with FIGS. 5–7. Timing specifications are given in two parts: first, for those signals which interface to the circuit system, and second for those which interface to the processor system.

This timing for the serial data inputs/outputs, signaling bit input/outputs, and enable signal inputs relative to the serial data clock are applicable to either the A or B channels.

Table IV below described the timing signals illustrated in FIG. 5.

TABLE IV

| Param | Description | Value |
|---|---|---|
| tclk | Data clock period | 450 nS min |
| tfe | End frame sync to begin data enable | 1000 nS min |
| tef | End data enable to begin frame sync | 1000 nS min |
| tes | Data enable setup before clock falls | 100 nS min |
| teh | Data enable hold after clock | 100 nS min |
| tdsu | Data in setup before clock | 100 nS min |
| tdh | Data in hold after clock | 100 nS min |
| tssu | Signal in setup before clock | 100 nS min |
| tsh | Signal in hold after clock | 100 nS min |
| tcd | Clock until data out stable | 75 nS max |
| tdc | Clock until data invalid | 15 nS min |
| tsoh | Signal out valid after clock | 15 nS min |
| tcs | Clock until signal out stable | 150 nS max |

Figure 6:
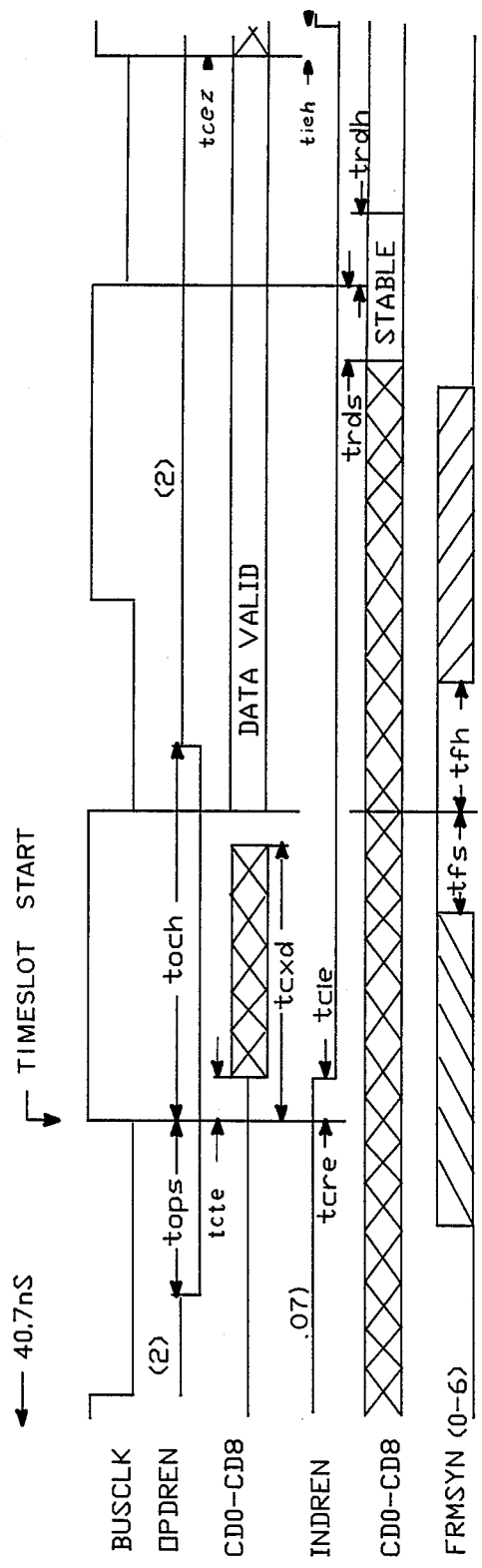

The timing for the parallel module bus interface signals, including the driver enable outputs, referenced to the bus clock inputs, are illustrated in FIG. 6 and set forth in Table V below.

TABLE V

| Param | Description | Value |
|---|---|---|
| toes | Output driver enable output setup before clock | 80 nS min |
| toeh | Output driver enable hold after clock | 140 nS min |
| tcze | Clock until circuit drivers enabled | 11 nS min |
| tcez | Clock until circuit drivers disabled | 11 nS min |
|  |  | 60 nS max |
| tcxd | Clock until circuit data valid | 70 nS max |
| tcie | Input driver enable after beginning timeslot | 70 nS max |
| tieh | Input driver enable hold into next timeslot | 10 nS min |
|  |  | 70 nS max |
| tras | Circuit input data setup before clock | 30 nS min |

TABLE V-continued

| Param | Description | Value |
|---|---|---|
| trdh | Circuit input data hold after clock | 30 nS min |
| tfs | Framesync input setup before clock | 30 nS min |
| tfh | Framesync input hold after clock | 90 nS min |

Figure 7:
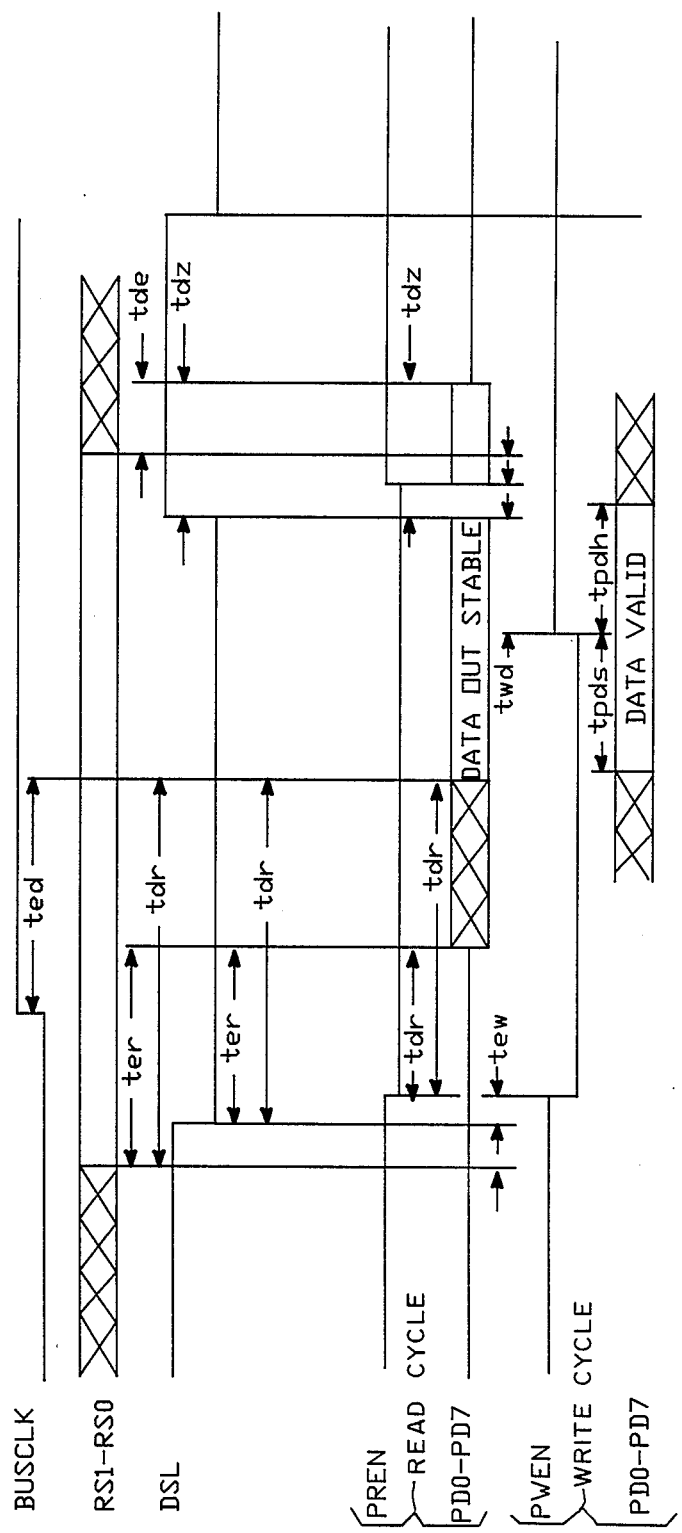

The timing for the processor bus interface signals is illustrated in FIG. 7 and set forth in Table VI below. The ter, tdv, tdz and tew signals are taken to be from the latest of RS1, RS0 or DSL.

TABLE VI

| Param | Description | Value |
|---|---|---|
| ter | Selects and read before drivers enabled | 50 nS max |
| tdv | Selects and read before data valid | 75 nS max |
| tcd | Busclk until data stable (read reg00 only) | 50 nS max |
| tdz | Drivers disabled after select or read | 100 nS max |
|  |  | 20 nS min |
| tew | Write strobe after select | 25 nS min |
| twd | End write strobe before select | 25 nS min |
| tpds | Data setup before end write | 50 nS min |
| tpdh | Data hold after end write | 50 nS min |

The BIC is controlled by the module processor. There are four ports which can be read from or written to. One port is used as a status/control port. The other three are used to write a three byte sequence to control the timeslot and sub-multiplex frame assignments.

The status/control port is addressed when RS0 and RS1 are both logical zero. Reading the BIC status/control port returns a single byte of status and eror information decoded as follows.

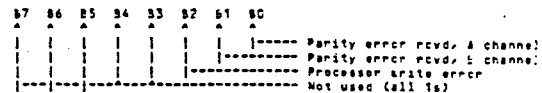

A processor write error indicates that bad parity was received from the processor. Reading the port clears the error registers.

Writing to the BIC status/control port causes the following action:

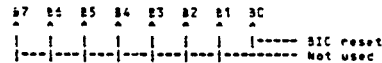

Reset performs the same functions as the hardware reset.

The timeslot/submux ports are written to in a three byte sequence. They should be written in the correct sequence: first the timeslot and submux registers, then the command register. Writing the command register causes the timeslot and frame register data to be transferred to the actual timeslot/frame register pair specified in the command register.

The command byte is written with RS1-0. It is coded as follows:

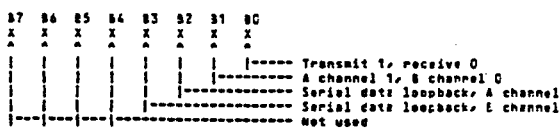

The time slot byte is written with RS1-0=10. It is coded as follows:

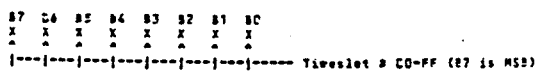

The frame byte is written with RS1-0=11 and is used to set the submux registers. It is coded as follows:

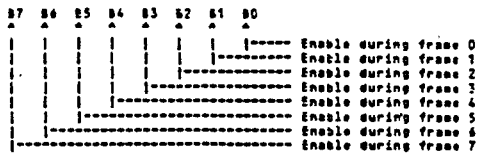

Note that this register is ignored when receive timeslot registers are loaded.

A read of the timeslot or frame ports allows the register contents to be checked.

Figure 8A:
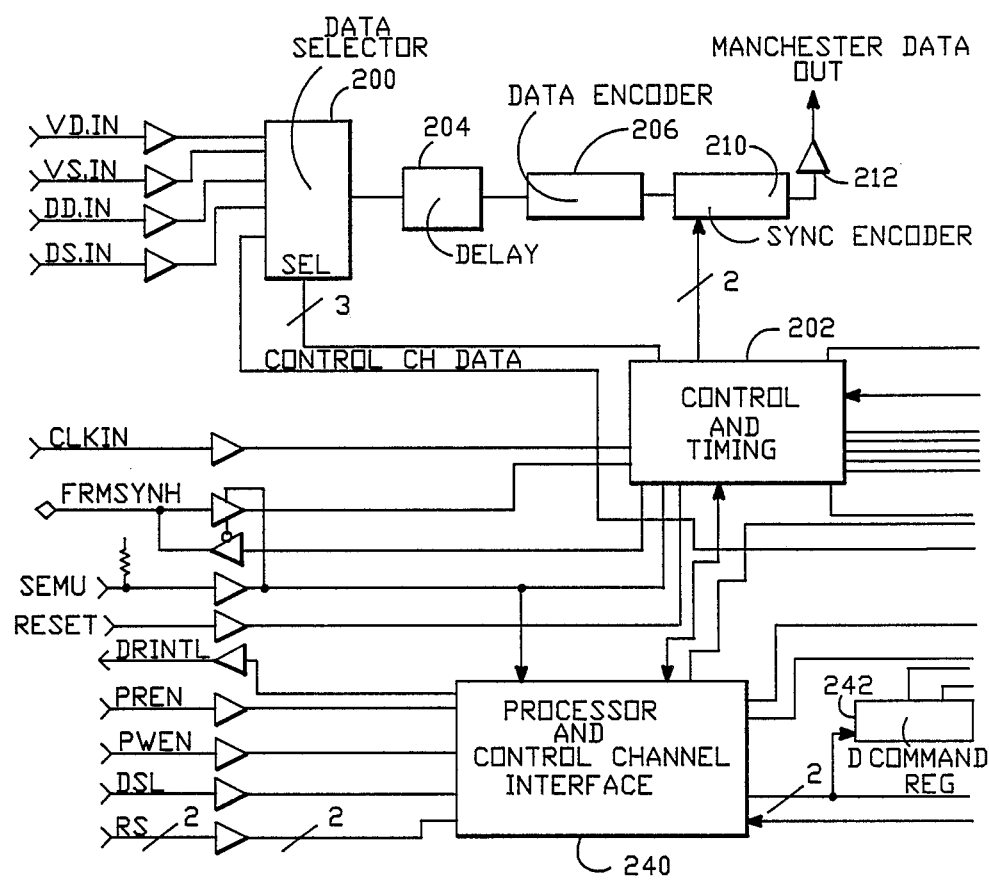
FIG. 8 depicts a block diagram of a station link encoder-decoder which forms a portion of FIG. 1.
Figure 8B:
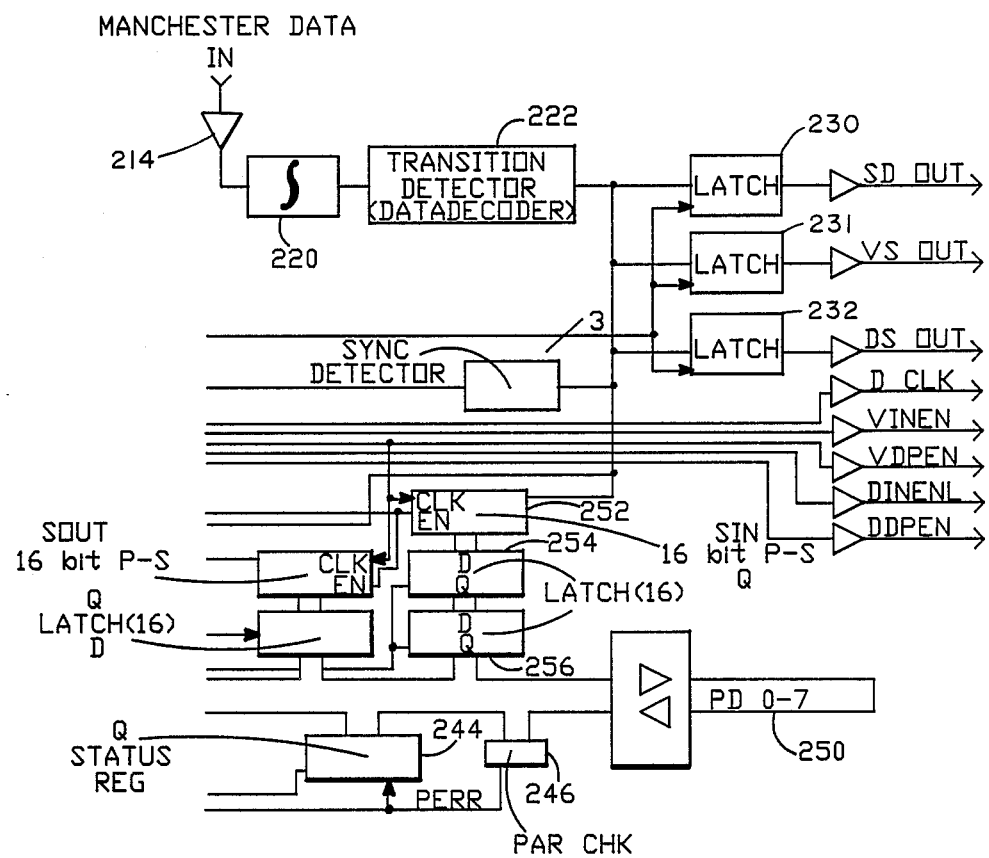

Referring now to FIG. 8, a block diagram of the station link encoder-decoder (SLED) is illustrated. The SLED provides three digital communication channels between the BCS central equipment and the Telephone Station Set (SS) of FIG. 1.

The following description is intended to define completely the SLED, both for external devices interfacing to the SLED and for the internal design of the SLED, and will be described in conjunction with the SLED timing diagrams illustrated in FIGS. 9A-9D and 10.

The station set is the primary user interface to the BCS of FIG. 1, interfacing with the BCS central equipment via standard office telephone wiring. A station link provides a digital communication channel between the central equipment and a station set. It is submultiplexed into three digital channels to allow the transmission of digitized voice, data, and station to central equipment control information.

Since the digital channel is ultimately sent via 24 gauge twisted pair telephone grade wire, the data coding format must have sufficient robustness to avoid errors caused by noise "hits" on the line. The coding must also be able to provide sufficient clock information at the receiving end to decode the data, as there is no facility for sending separate clock.

The Station Link Encoder-Decoder (SLED) is a semi-custom CMOS integrated circuit which is installed at both ends of the station link. The SLED performs multiplexing and demultiplexing, data encoding and decoding, and a processor interface.

Three two-way digital channels are provided in the station link. These three channels are:

(1) A 72 kilobit/sec channel used for transmission of digitized voice (utilized as a 64 kb/sec voice channel and a simultaneous 8 kb/sec channel for signaling).

(2) A 72 kilobit/sec channel used for data transmission (utilization to be defined in the specification for the station set data interface option).

(3) A 16 kilobit/sec channel used for communication between the station set processor and the module processor (the "control channel").

The SLED is installed on both the station interface unit (SIU) and at the station set. The SLED performs two basic functions:

(1) Multiplexing the three channels together into one serial data stream and encoding the data into a modified Manchester II code to be transmitted to the other end of the link.

(2) Receiving and decoding data from the other end of the link and demultiplexing the three components therein.

Each 72 kB/s channel is further broken down into a 64 kB/s and an 8 kB/s channel. The two 64 kB/s channels have serial I/O interfaces. The inputs are separate for the two channels, and the outputs are combined on a multiplexed output line.

The signaling channels use completely separate input and output lines to allow maximum flexibility when installed in station or central equipment.

Five data sources enter the selector 200: "A" channel data and signaling, "B" channel data and signaling, and control channel data. Multiplexing is performed by the control circuit 202, selecting the appropriate inputs in the appropriate order during the frame.

Data is then routed to the data encoder 206 through delay 204. The encoder 206 converts the serial data into Manchester II encoded data minus the required synchronization sequences. The data encoder 206 output is sent to the sync encoder 210; which applies Manchester II synchronization sequences at the beginning of each data packet under control of the sync controller.

The sync encoder 206 output is sent through an I/O buffer 212 and out of the device.

Received data is sent via buffer 214 to an integrator 220, which serves to prevent noise hits from being improperly detected as data transitions.

After integration, received data is sent to a transition detector 222 which has outputs indicating whether a high-to-low or low-to-high transition has occurred on the input.

Transition detector 22 output is routed to a set of latches 230, 232, which, by means of the control and timing circuits 202 latch the high-to-low transistion detector output. By selecting which transitions are latched, the data and signaling information is extracted from the transition detector output.

The SLED contains a processor interface 240 which is used both for control channel information I/O and a status/control register. The interface controller enables the correct buffers and latches at the appropriate times to read and write data on the processor data bus 250. It also has an interrupt generator which will cause a processor interrupt when the control channel requires processor service.

On the control channel receive side, serial data is strobed into a 16 bit serial to parallel converter 252 by the data clock when enabled by the control and timing circuit 202. At frame sync, the received data is transferred to a set of two holding buffers 254, 256. These hold the data until the processor can read it. When enabled by the processor interface controller, the output buffers place the received data on the bus 250.

On the transmit side, data is latched from the processor bus 250 by the interface controller. At frame sync, the data is transferred to a 16 bit parallel to serial converter 260 so long as the flow control bit has not been sent from the opposite end. The serial output is multiplexed into the serial output stream at the appropriate time by data selector 200.

Flow control and message control mechanisms also exist.

Message control consists of two bits sent along in each frame, indicating one of four states of the data in the control channel. The actual utilization of these two bits is not defined here. The only requirement which the hardware imposes on their use is that 00 (neither bit set) indicates that there is no data present on the control channel. The message control bits are sent and received in a separate register pair; when sending from the processor to the link, the message control bits are written last, and their being written causes the write sequence to begin upon the next frame sync. They must also be read last, as a read of the message control bits causes received control channel data to ripple through the holding buffers and the data currently in the holding buffers to be discarded.

Flow control is a single bit which is triggered by both of the receive data buffers being full; it is sent back to the transmitting end to stop further transmission until the receive buffers can be serviced. The flow control bit can be read to check whether flow control is being performed.

The status register 244 has several one bit indications (such as receive data ready, receive data error, etc.) which are placed on the bus when the port is read.

The control register 242 is used to allow the processor to issure various commands to the SLED circuitry, such as to disable, interrupts, perform loopback tests, and reset.

Parity is checked by parity checker 246 and generated on processor data whenever the SLED is installed in the central equipment. Parity is ignored in the station set.

There is a central timing and control circuit which operates the entire SLED, excluding the processor interface. When the SLED is installed in an SIU, the control circuits use the 4.096 MHz bus clock for timing. When the SLED is installed in a station set, a 4.09 MHz crystal oscillator is used instead. Additionally, the SLED receives frame and superframe sync from the module bus when installed in the SIU, and receives frame and superframe sync from the incoming link data when installed in the SS.

The timing and control circuits also provide a 256 KHz output clock and voice and data enable signals. These are used to strobe serial data in and out of external devices interfacing to the SLED. Framesync is provided as a SLED output when the device is installed in a station set.

Power requirements for the SLED of FIG. 8 are +5V+/−10% 10 mA max. All inputs and outputs are standard EIA/JEDEC format for CMOS industry B specifications, Vdd=5V.

Table VII below lists the input signals of FIG. 8.

TABLE VII

| Sig Name | Signal Description |
|---|---|
| VDAT | Digitized voice bits in |
| VSIG | Signaling bit in for voice channel |
| DDAT | Digitized data bits in |
| DSIG | Signaling bit in for data channel |
| MANIN | Manchester encoded data in from link rcvr |
| MCLK | 4.096 MHz clock in |
| FSYN | Frame sync in (IU only) |
| SIU | Selects SS or IU installation |
| ENPOL | Selects polarity of DATCLK and enable signals |
| PREN | Processor read enable |
| PREN | Processor write enable |
| DSL | Processor device select |
| RS0-RS1 | Processor register select |
| RST | Reset SLED |

Table VIII below lists the I/O signals of FIG. 8. (PDP is only available in the IU installation.)

TABLE VIII

| Sig Name | Signal Description |
|---|---|
| PD0-PD7 & PDP | Processor data bus |

Table IX lists the output signals of FIG. 8. (CCLK is only available in the station set installation.)

TABLE IX

| Sig Name | Signal Description |
|---|---|
| DATOUT | Serial voice and data bits out |
| DATCLK | 256 kHz clock out for serial data I/O |
| VIPEN | Input data enable for voice bits |
| VOPEN | Output data enable for voice bits |
| DIPEN | Input data enable for data bits |
| DOPEN | Output data enable for data bits |
| VSO | Signaling bit output for voice channel |
| DSO | Signaling bit output for data channel |
| MANOUT | Manchester encoded data out |
| FSYN | Frame sync out (SS only) |
| INT | Control channel data ready interrupt |
| CCLK | Coded clock, 2.048 MHz |

Data on the station link will be transmitted using a modified Manchester II coding format. During each frame, a complete packet of data is transmitted: a synchronization sequence, eight voice bits, eight data bits, two signaling bits, and five control channel bits.

Data is sent at a 256 kB/s rate. With 23 data bits and 6 bit positions used for synchronization, this leaves 3 bit positions, or approximately 11 microseconds, between packets.

The synchronization sequence is sent at the beginning of each packet of data. The sequence is used to define the packet, to define the multiplexing of data within the packet, and to define the transitions which contain data.

The sequence consists of three Manchester zeros followed by a sync pulse. (The use of only three zeros is what makes this a "modified" Manchester II scheme, as conventional Manchester II uses a sequence of 8 zeros in the synchronization sequence.) A command sync pulse defines the beginning of every supeframe, while a data sync pulse is used to define the beginning of the other seven frames.

At the station IU, the synchronization sequence is triggered by frame sync received from the module. At the station set, the synchronization sequence (and therefore the next packet of data) is triggered to be sent by the reception of a synchronization sequence from the central equipment. This insures that the receive and transmit data rates are synchronized to each other.

Data and voice bits are sent in the same order as they are received. The data and voice signal bits are sent at the beginning of each packet.

The message control bits indicate what type of control channel data is present. They are set by writing to the command register, and cleared when the word has been sent. Data must be written to the data register first; the subsequent write of these two bits will cause data to be transferred to the output register at the beginning of the next superframe. The SLED itself uses the presence of a logical one in either or both bit positions to indicate data present, and therefore to issue an interrupt. Otherwise, the SLED's operation is independent of these bits, and they are merely passed through to the receiving end where they can be read in the status register.

The flow control bit is set whenever further data being sent to the opposite end of the link would cause the old data to be lost. As soon as the registers at the opposite end are read, the flow control bit is cleared and subsequent data transfers can take place.

After the synchronization sequence is sent, 23 bits of data follows. The overall composition of one packet is as follows:

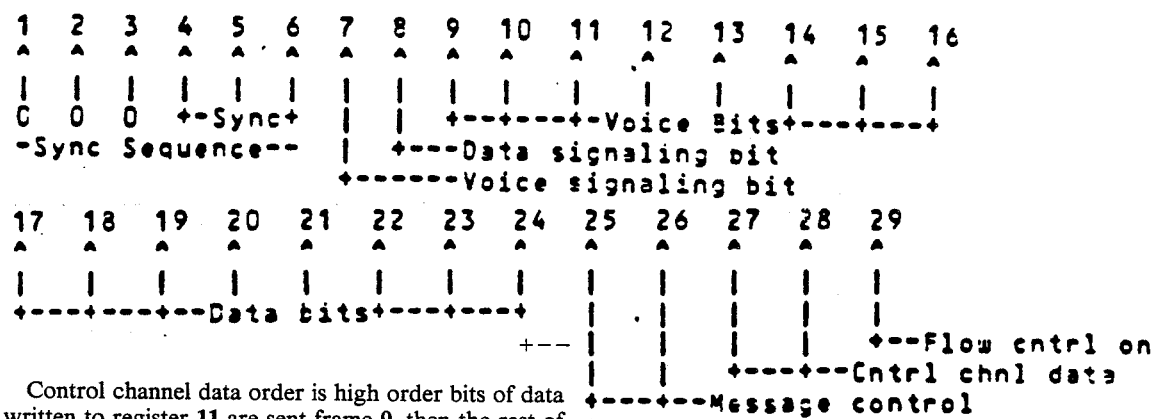

Control channel data order is high order bits of data written to register 11 are sent frame 0, then the rest of register 11, then high order bits of register 10, and finally the remaining bits of register 10. With two bits sent per frame, a total of 16 bits are sent per superframe.

Figure 9A:
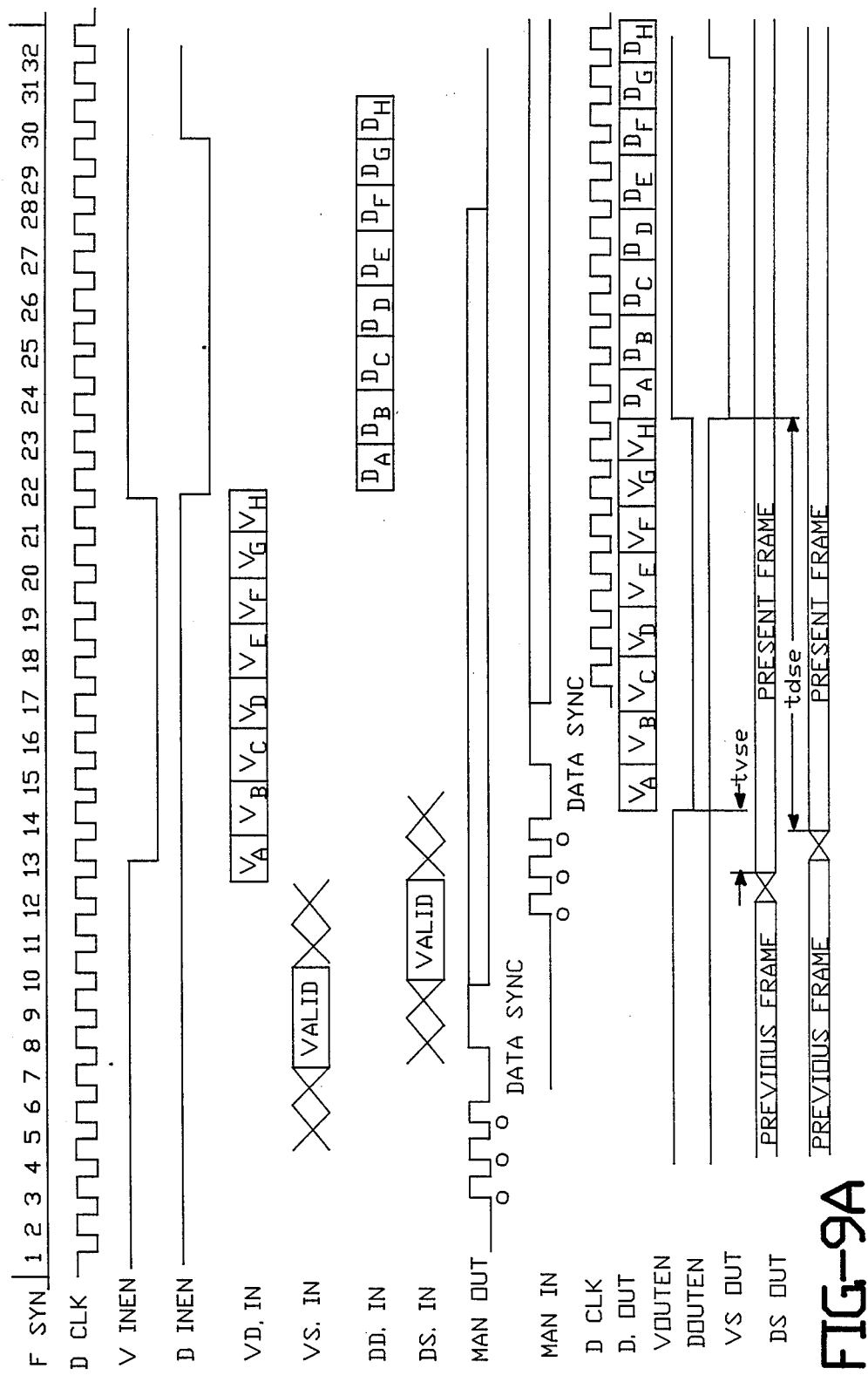
FIGS. 9A–9D and 10 depict timing diagrams for the station link encoder-decoder of FIG. 8.
Figure 9B:
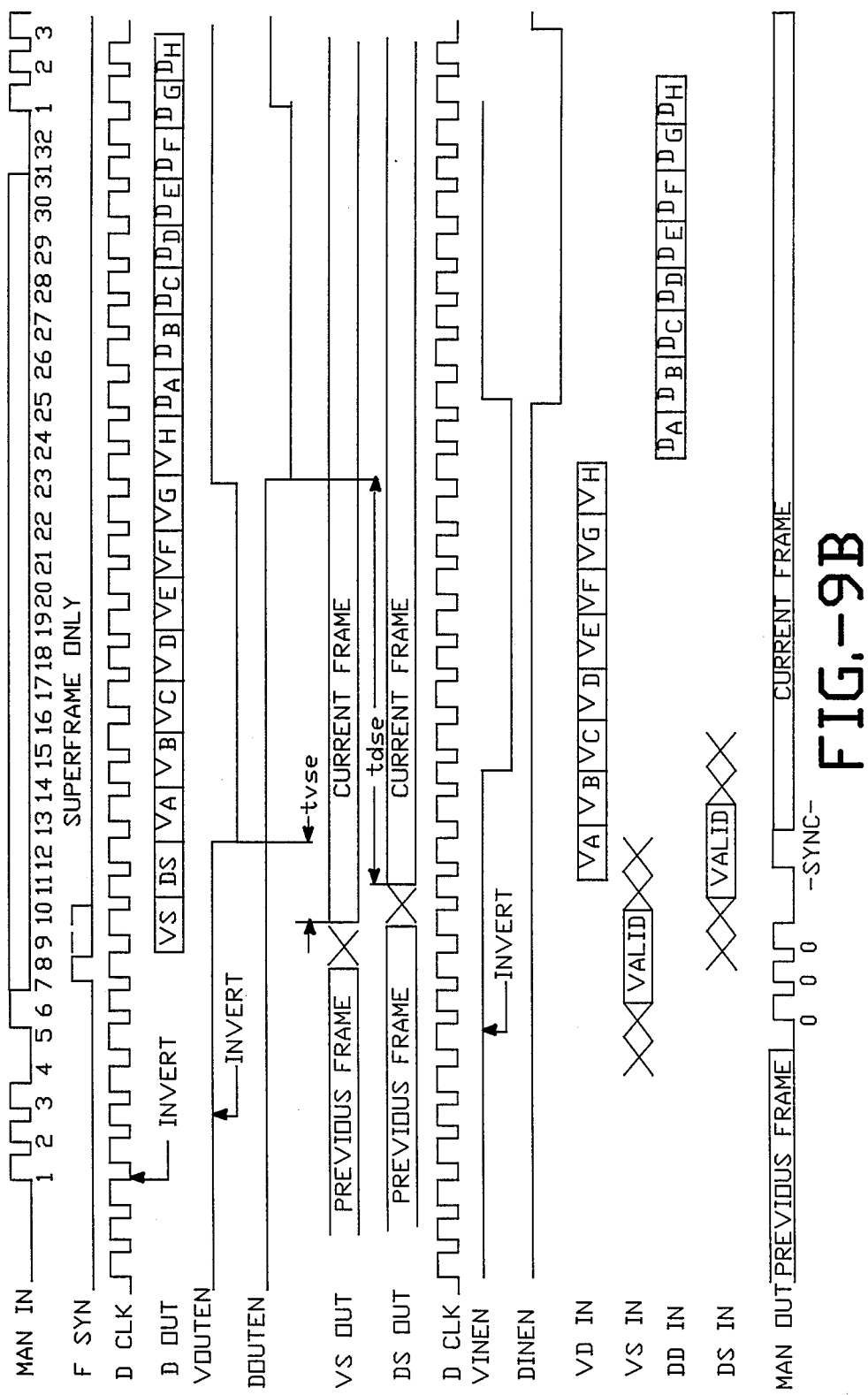
Figure 9C:
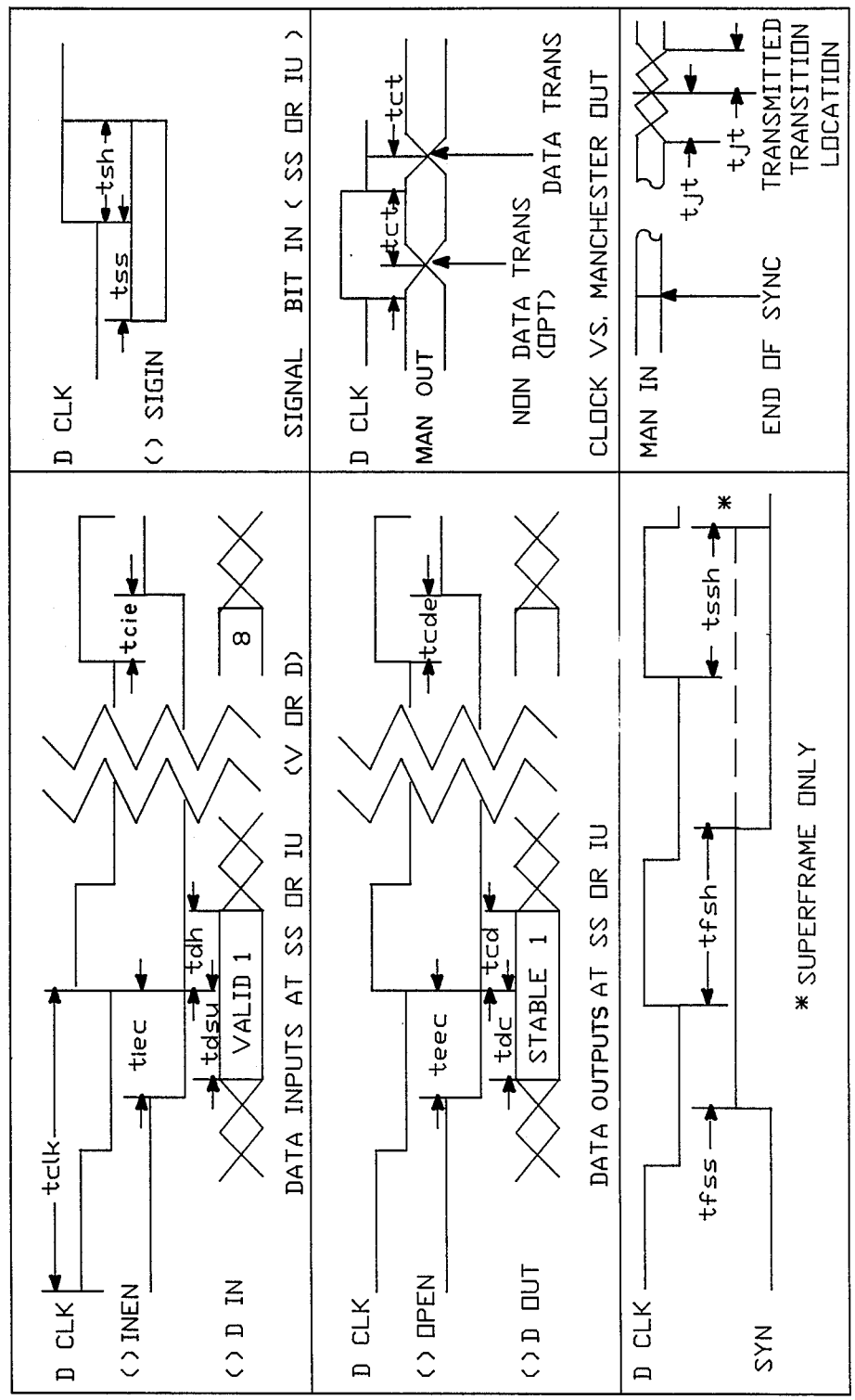
Figure 9D:
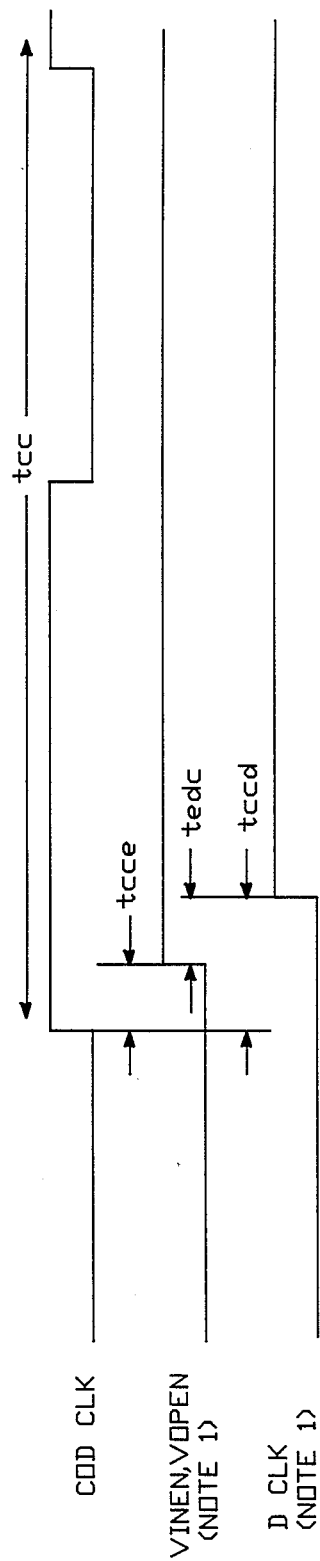

This timing requirement for input signals to and timing specifications for output signals from the SLED are illustrated in FIG. 9A-9D and 10. Timing information is divided into two parts: first, for those signals which interface to the serial I/O system, and second for those which interface to the processor system. In FIG. 9D, the enable and clock polarities are shown for a station set installation (EVAPOL LOW). Also in FIG. 9D, the tcc=2tmc, where tme is the master clock period; tccc=0 nS min. and 100 nS max.; tccd=0 nS min. and 100 nS max.; and tedc=−50 nS min. and +50 nS max.

The timing requirements for the serial data input/outputs, signaling bit input/outputs, and enable signal outputs are described below in Table X and illustrated in FIGS. 9A-9D.

TABLE X

| Param | Description | Value |
| --- | --- | --- |
| tbclk | Period of 4.096 MHz clock | 244 nS +/− 1 nS |
| tdclk | Period of DATCLK | tbclk × 16 |
| tnclk | high portion of DATCLK | tdclk + 100 nS max |
| | | tdclk − 100 nS min |
| tiec | Input enable setup before clock | 250 nS min |
| | | tdclk/2 − 25 nS max |
| tcie | Input enable hold after clock | 250 nS min |
| | | tdclk/2 + 250 nS max |
| tdsu | Data in setup before clock | 250 nS min |

TABLE X-continued

| Param | Description | Value |
| --- | --- | --- |
| tdh | Data in hold after clock | 250 nS min |
| tss | Signal bit setup before clock | 250 nS min |
| tsh | Signal bit hold after clock | 250 nS min |
| tfss | Framesync valid before clock | 1 uS min |
| tfsh | Framesync valid after clock | 1 uS min |
| tssh | Superframe sync valid after clock | 1 uS min |
| toec | Output enable setup before clock | 250 nS min |
| tcoe | Output enable hold after clock | 250 nS min |
| tdc | Data output valid before clock | 1 uS min |
| tcd | Data output valid after clock | 1 uS min |
| tjt | Jitter on any edge relative to sync | 600 nS max |
| tct | Manchester transition after clock | 200 nS min |
| | | 500 nS max |

Figure 10:
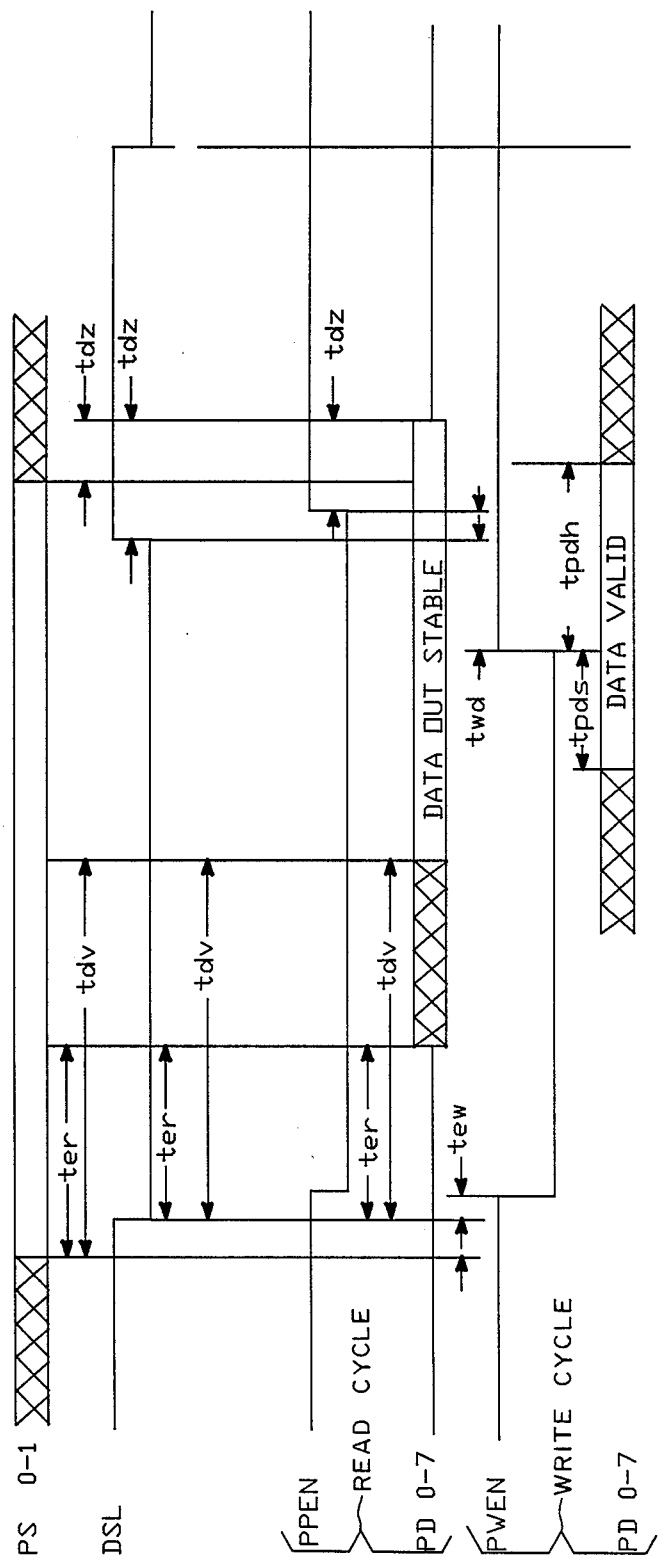

The timing for the processor bus interface signals are described below in Table XI and illustrated in FIG. 10.

TABLE XI

| Param | Description | Value |
| --- | --- | --- |
| ter | Selects and read before drivers enabled | 100 nS max |
| tdv | Selects and read before data valid | 150 nS max |
| tdz | Drivers disabled after select or read | 100 nS max |
| | | 20 nS min |
| tew | Write strobe after select | 25 nS min |
| twd | End write strobe before select | 25 nS min |
| tpds | Data setup before end write | 50 nS min |
| tpdh | Data hold after end write | 50 nS min |

The ter, tdv, tdz, and tew are taken to be from the latest of RSL or DSL.

Processor interface with the SLED is via four read/write ports. One port is used for status information during read and command information during write. Another is used for sending and receiving message control bits. The last two are used for sending and receiving control channel data.

The C/S register is accessed with RSL 1-C=00.

The command (write) register is coded as follows:

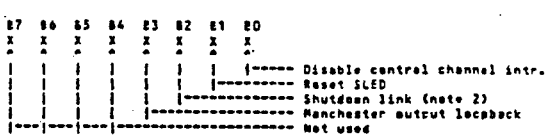

The status (read) register is coded as follows:

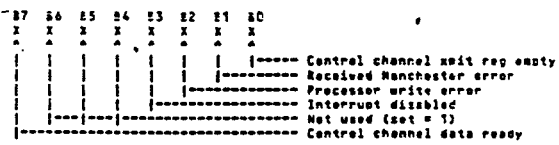

Link shutdown is used in order to allow the central equipment to reset a station processor.

Message control register (MCR) is used to send and receive the message control bits, and to determine whether flow control is in effect on the control channel. The bits are defined in the Link Data Format section. RSL 1-O=01 selects the MCR.

The MCR is written as follows:

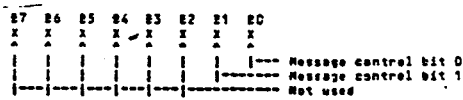

The MCR is read as follows:

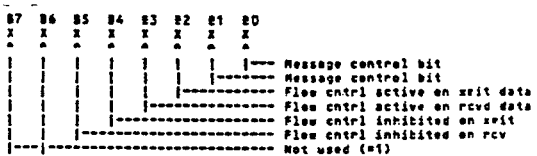

The control channel data registers are written and read to send and receive control channel information. Data sent on a register at one SLED will be received on the same register at the other SLED. Transmission will not begin until the message control bits have been written to the MCR. Once the message control bits have been set, further writes to the MCR will not affect the control channel information until xmit register empy is true.

The network operating system (NOS) of the present invention will now be described in conjunction with FIGS. 11-14.

A computer system designer or integrator with the task of developing a telephone-based, integrated voice, data and application communication system for businesses with just 10 to 100 telephones cannot use the tools and technology appropriate for a high end communication system. Techniques to solve this dilemma vary, but one solution is the object model decomposition technique. This technique calls for the system to be divided into "objects," each of which is responsible for a specific system capability. Examples of the highest level objects include the system's switching matrix, control subsystems, and signaling subsystem.

This process formally defines an object as a unique entity that receives a specifiable input, performs an operation, and generates an output to another object. Objects defined at the beginning of the process are then successively decomposed into the next level, or "moved to another level of abstraction." At each level, services and requirements common to the objects are pursued. These shared services and needs are gathered together to form the operating system software requirements.

In conjunction with explicit voice and data communication system requirements, this technique is instrumental in realizing an appropriate decomposition level to implement different communication system capabilities. For example, the decomposition process reveals that the basic path services required in a communication system (i.e., making, monitoring and breaking down paths) have the software form of an application, just as an electronic directory is an application.

This process can be implemented by the computer system designer for a variety of operating systems, including communication or process control computers. It also enables the operating system, rather than the hardware, to control expansion and upgrading. All this facilitates the speedy and efficient design of a variety of computer systems.

The present invention uses this technique to solve the voice and data handling communication problem. The NOS supports private branch exchange (PBX) features for easy telephony. In addition, it is compatible with the data generated by many computer types regardless of vendor, operating system or size.

The system closely models the techniques used on operating system research, rather than classical communication system design methods. In the classic approach, switching hardware and software are the system's heart, and the operating system is designed to support these switching requirements. In contrast, the object model decomposition approach presupposes that all system requirements can be analyzed in the beginning of the design and that all common design elements can be isolated at each design step.

The benefits of the message-passing software in NOS are typical of object model decomposition-based design. It also helps determine common communication system needs that the operating system could solve. These needs make this operating system process interface different from previous operating systems. For example, formal support of both channel addressing (do function x on channel y) and transaction addressing (do function x, number z, and signal when finished) are capabilities available at the process interface.

Critical to the system's development is an architectural design that accommodates all of the system's anticipated functions and degrees of freedom. The technique used to generate this design involves four steps. These include agreeing on the model of the connecting devices, selecting the future growth paths or degrees of freedom, establishing maintainability, availability and reliability goals (e.g., wait no more than 150 ms for a dial tone), and recursively decomposing the problem into finer and finer objects.

Also fundamental to the design process is a set of "what technology is available" decision. These set a time frame and cost goals for system design. For example, one major decision stemming from this time frame consideration is the splitting of realtime control and responsiveness into intelligent interface units, separate from the communication system's resource control and database manipulation processor. another decision reflects that the software "mechanisms" for system operation should be in the interface units (e.g., looping back a data stream), and the software "policy" should be in the module processor (e.g., go loop back).

The system includes a module that contains a digital backbone, interface units, a module processor subsystem and a storage subsystem, as illustrated in FIG. 1. A wide range of special-interface units can be attached to the digital time division multiplexed backbone. Each of these interface units is an intelligent, distributed partner in system operation. Note that voice is converted from analog to digital form in a station set with a display and keyboard using industry standard mulaw codecs to permit the entire switching unit to operate digitally.

For both the voice and the data handling capabilities of the classic PBX-like communication system, the communication software developers' freedom is limited. Typically, developers selected a realtime operating system model. In this design, only a limited priority system can be set up, and it is usually run from a master interrupt. Moreover, system processes are created and given a priority level when the system is initially designed. When an interrupt occurs, the interrupt handler calls the appropriate process and it begins to run. Each process is designed to be complete in a very short time, or to "call" a process at a much lower priority level for additional processing.

In general, all processes in these systems share memory and communicate via globally known memory locations. This design is efficient in terms of needed computer power and memory space. But, it is difficult to maintain or enhance. Most voice and data handling PBXs are a variation of this theme.

Once the requirements for a network operating system are generated by the object model decomposition technique, it is important to examine how the operating system meets classical (necessary) operating system criteria. The most important question is the processor/memory/communication schedule trade-off. However, these trade-offs are not well-known at the early design stage. Therefore, at least one of them (e.g., memory) must be thought of as fairly flexible.

There are also consideration of system throughput, response time, and availability. Throughput can be considered a measure of transactions per unit time, and is a function of both the hardware and the software system design. In NOS, constraints are defined for the number of messages per second that can be delivered to applications, and for the scheduling overhead. This is a typical design approach for computer-controlled communications.

To meet these and other design goals, critical system constraints must be defined. These include the number of processes to be managed, the priority distribution and the runtime requirements. These decisions affect the operating system's database size and scheduling algorithm. They also allow rough computation of the overall system response time for a set of operations.

Along the its system services, an operating system must address itself to resource management issues like fairness and protection. The primary resources managed by the operating system are buffers (quantity, size, by what process, and number per process) and messages (number outstanding on a specific port of a process).

Often, processes need to communicate with each other. This is possible by passing values on a shared stack, sharing data bases, or message passing. Selection of the process communication mechanism affects the "cost" of communicationns betwen cooperating processes and the case of moving the processes to different machines. In this system, message passing is used for flexibility. There is also an optional buffer that is "given" away to the message receiver.

The message-passing structure does not require the process developer to know the internal structure of other processes. In addition, it also allows the hardware design to implement a memory protection mechanism, and facilitates network communication by hiding the real location of other processes that may later be housed in other modules. Thus, the message-passing structure facilitates process development.

As described earlier, object model decomposition generates a set of objects, each object a separate abstraction with its own input operations and outputs. Consequently, the order of operation execution is determinate between any two objects. However, since many object sets are managed concurrently, a mechanism is required to give priority to different processes servicing sets of objects. Normally, a priority structure contains the processes and is evaluated after every message transmission. A timeslicing scheduler driven by a hardware clock interrupt is also used.

As might be expected, some form of protection from inadvertent destruction of code, state or data is necessary since multiple processes share resources. many voice and data communication systems do not feature hardware protection; this makes resolution of some system faults difficult or impossible to accomplish. In a highly reliable communication system, nothing short of a hardware protection scheme is appropriate. Therefore, processes are protected by a set of hardware registers associated with each process's mapping register. This system causes an immediate trap whenever a process attempts to access beyond its allowable address range.

Finally, in any operating system, some method of synchronization between processes must be supported. In shared memory systems, these are sometimes called monitors/locks. NOS supports synchronization by allowing a process to perform a blocking read on a specific port when it requires a message. This means posting a read for a specific message to arrive on a specific input port, and dismissing until it arrives (or a timer goes off).

Figure 11:
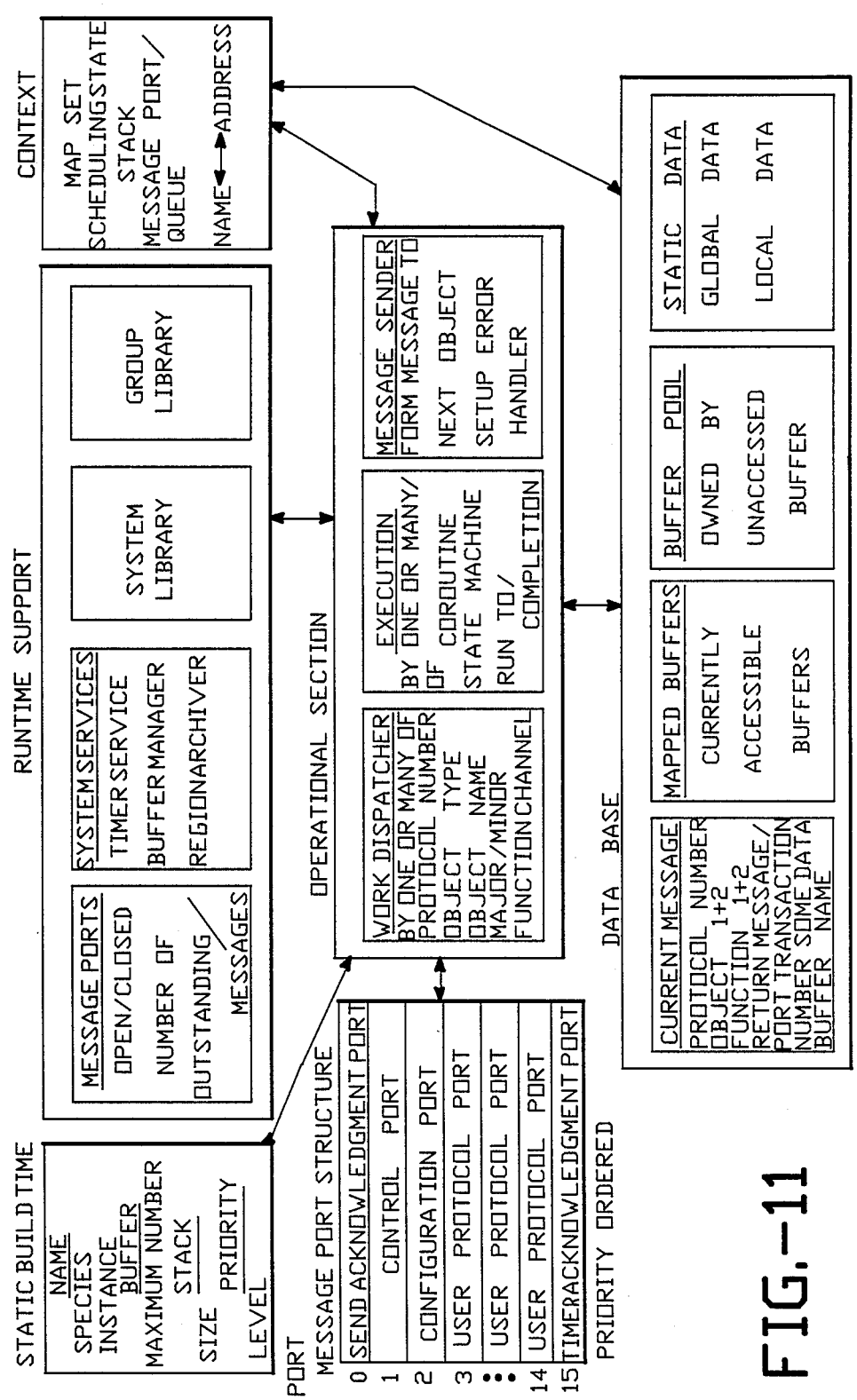
FIG. 11 depicts a diagram illustrating the major components of the network operating system (NOS) according to the present invention.

Once the demands of classical operating systems are met, a model process is selected to study how processes communicate among themselves. The operating system supplies an environment for the rapid development and efficient execution of processes that closely follow the model. In fact, its interface allows the solution of many problem classes. These include single object per process, multiple object per process, hierarchical object addressing to two levels, hierarchical function addressing to two levels, and channel orientation addressing. Processes communicate via a protocol that is given a unique number and revision level to allow elements of the system to evolve in a controlled manner, and to supply a first level dispatching method. The model process and environment has six major components: the static build region, runtime support, context region, execution region, data region and message structure, as illustrated in FIG. 11. In FIG. 11, the network operating system's (TNOS) model process environment has the six parts shown. These help the computer system designer determine the best method of communication between the operating system software process and the operating system kernel.

The statis build parameters form a set of information given to the communication system and a generation process to define the initialization specifics. These include the process name, resource requirements and runtime limits. For its part, the runtime support backage supplies a set of system services, group libraries and system libraries, as well as resource requirements and limits that can be dynamically set. The system services include a timer that can send a process-defined message to the process at an appointed or relative time, and a region archiving service that can store and retrieve regions by name on a rotating storage device.

The context region contains the per process information NOS requires to properly manage the process and to protect it from inadvertent damage. Each context block is evaluated on a scheduling cycle to determine the appropriateness of allowing a process to execute.

The operational section contains a message dispatcher, execution and message sender. The message dispatcher is coded to fit the developer's model of how the work is to be managed or scheduled inside the process. This allows for development of an internal per process operating system that fits a specific need or processing model.

The execution section performs the object database manipulations, and determines if additional processing is required from outside this process. From here, the message sender section, which packages a response to the caller and/or a message to another object (process) in the correct form and sends it out, is called. Then the process loops to the message dispatcher and sets up to get the next message.

The database section contains all the data base required to operate the process. Because code and data are separated, code segments can be shared between multiple instantiations of a specific process. The model process maniulates four kinds of data bases plus local variables stored on the stack. The process has the message protocol header available as it processes the incoming message. This database is special because of its general usefulness throughout the execution of the process, and is globally available inside the process.

The mapped buffers are dynamically allocated buffers gotten by the process to keep a "per something" database at startup or may have been passed to the process during a message receipt. Each process may "look" at up to two of these buffers at once.

The rest of a process's dynamic buffers are kept in an unmapped state. This makes them owned, but not accessible, without an explicit "accessbuf" system operation. Finally, each process has a static data area in which global and static variables can be located and accessed.

The last component of the model is the message structure. This is a set of 16 message queues per process that have implicit and explicit definition. The system manages the message ports as queues in a priority manner. Thus, if one message is waiting on message port 3 and another on message port 5, the system will give the process the message on port 3 before the next read of the message ports by the process, then the next read will return the newer message on port 3. The system uses message ports 0 and 15 for supplying acknowledgements as well as negative acknowledgements for system services, and these are neither accessible nor controllable by the process. Ports 2 and 3 are used by the control and configuration subsystem to communicate to all processes in a like manner and to assure that its commands receive the highest priority.

An example is useful in explaining now the NOS environment supports operation, control and error-handling. The example process is called the user interface process and is responsible for the syntactic and limited semantic parsing of commands for the application set. It also masks the applications from device idiosyncracies. It is a multichannel process, handles multiple protocols and uses an interpreter with loadable scripts to isolate the application-specific command sequences from the user interface environment. At system initialization time, the process is created and awaits configuration.

The configuration system determines both hardware and software availability and then proceeds to inform the applications and user interface of the sytem resources they are to know about. This is done by means of a configuration protocol and is sent to a "configuration" message port. At any time during the operation of the sytem, additional configuration messages may arrive that can perform functions such as install, activate, pause, continue, deactivate or deinstall on an object or object set.

Once the user interface has some resources, it begins to communicate with the applications via application-specific protocols and with the appropriate drivers via driver-specific protocols. These messages are sent to the message port as specified by the protocol, but responses are returned to the message port of choice as specified by the user interface. A voice or data connection, or some kind of asynchronous event soon occurs and a work sequence is started. This will cause a message or a set of messages to start traveling through the system. Each of the messages updates data bases, causes more messages, or has the user's display updated until the transaction requested has been supplied. The user interface is only one of many processes, but it is typical in that it uses many of the available NOS interfaces.

One fundamental attribute of a network operating system is the need to resolve both the process-naming and the name-to-address translation issues. NOS's naming convention makes processing location-independent and provides two levels of names—named by service and absolute name. The flexible naming system provides enhanced fault tolerance by letting processes request what they need instead of to whom they wish to communicate.

Figure 12:
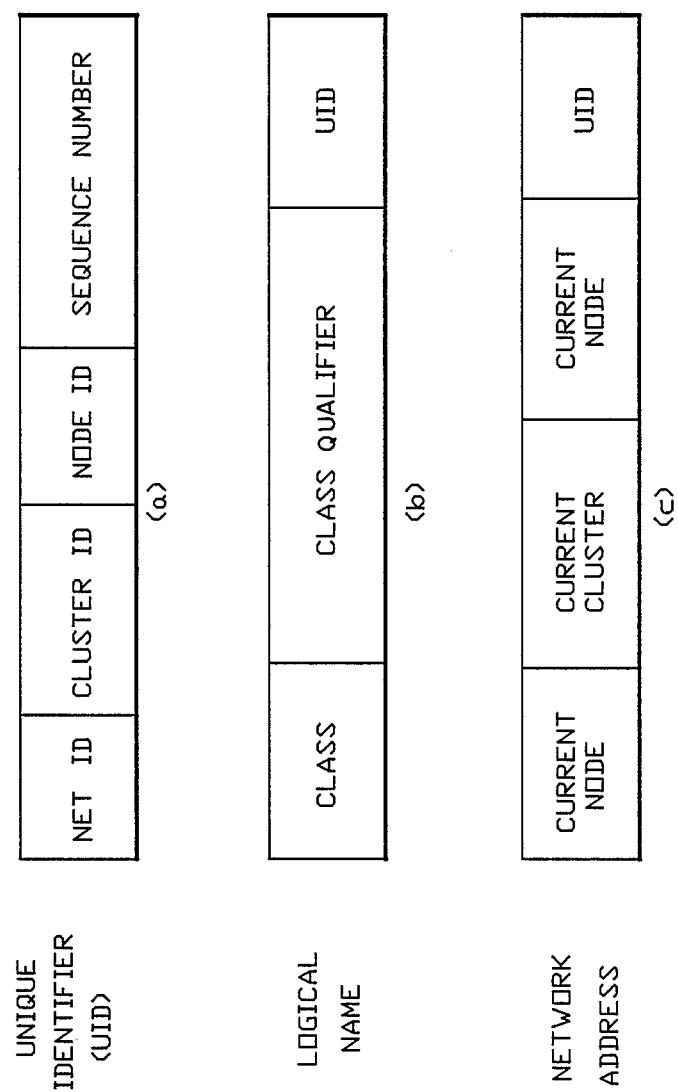
FIG. 12 depicts the NOS name and address formats.

In NOS, processes have a logical name, or system-unique identifier (UID), and a network address. The NOS UID is a 48 bit ID whose uniqueness is guaranteed across the entire network, and is assigned at process creation time, as illustrated in FIG. 12. In FIG. 12, the network operating system processes have specific name and address formats. The unique identifier (UID in (a) is included in both the logical name (b), and the network address (c). It is 48 bits long, guaranteed to be unique and is assigned at process creation time. Processes are not allowed to take advantage of the contents of the name, except the remote interprocess communication (IPC) system, which uses the name information as a hint to optimize the access time to locate the process. Since processes may not know the UID of other processes with which they wish to communicate, a mechanism of logical names and logical name translation is created.

The logical part of the name is assembled by the sending process by selecting a class, is typically a service of some type (e.g., file or directory server), and a class qualifier (e.g., local, offnode, all, named). A special class qualifier (named) allows a process to communicate with a specific process and uses the supplied UID as a communication handle. This approach allows very efficient addressing once two processes locate each other because no evaluation or re-evaluation is necessary.

Network addresses are formed by concatenating the local UID to the current location of the process. This new, larger form is also guaranteed to be unique and absolute. Network addresses are moved through the network on a need-to-know basis by a group of processes called Name-to-Address Mappers.

With NOS, processes can find each other by logical or real name. But it is also helpful to specify a standard message format. Such specification allows a process to represent a number of objects as channels and receive different protocols for each, all the while knowing that, at least at the most basic level, the message format is similar.

Figure 13:
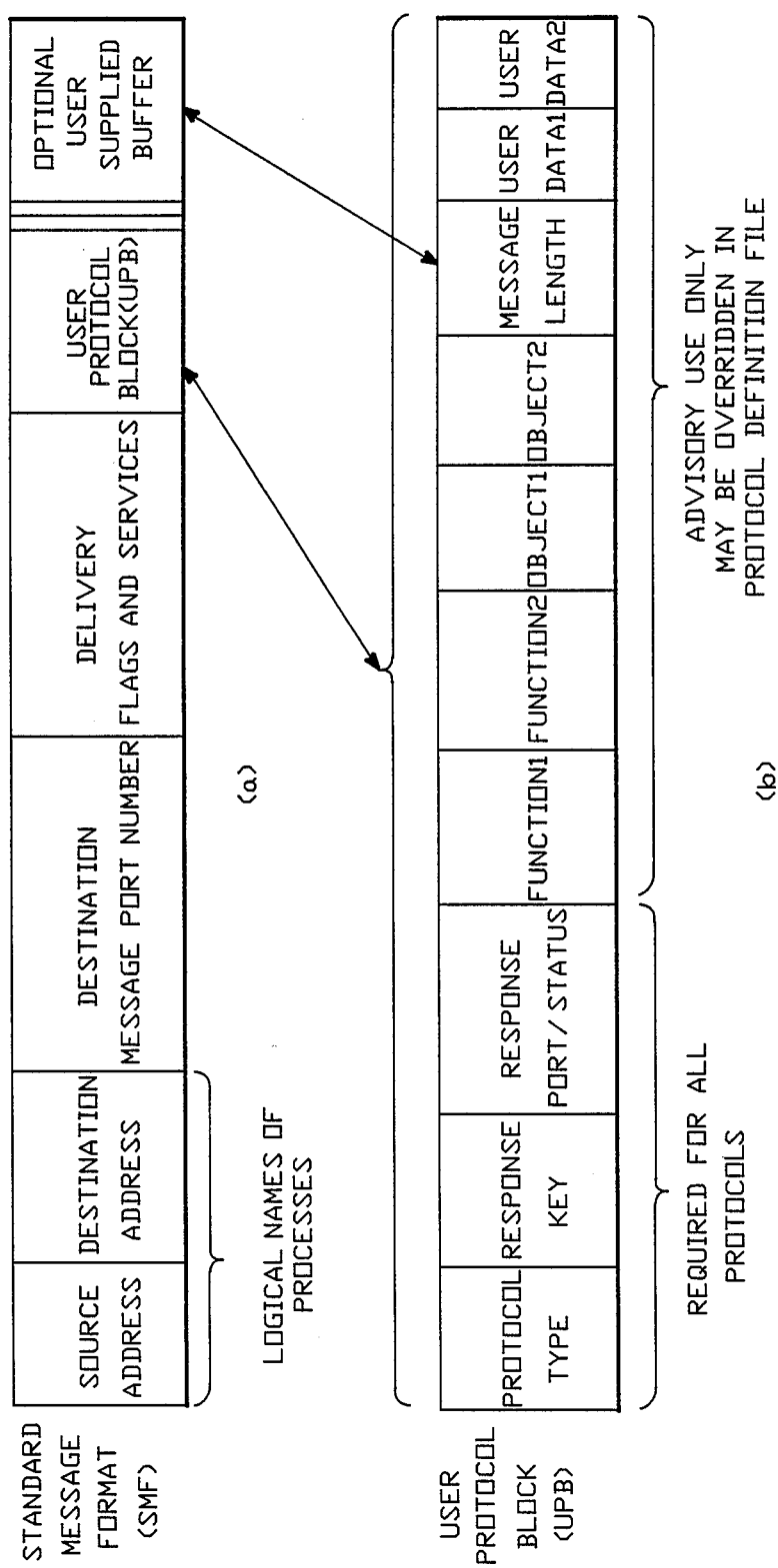
FIG. 13 depicts the NOS standard message format.

FIG. 13 illustrates the standard message format including the User Protocol Block (UPB). Processes are required to abide by all the fields of the standard message format, by the protocol number field, and the response port field of the UPB. Remaining UPB fields are advisory and may be overridden by explicit definition in the appropriate protocol definition file. In FIG. 13, the TNOS standard message format (SMF) in (a) includes the user protocol block (UPB) in (b). Part of the UPB is optional and may be suppressed by the particular protocol in use. Similarly, there is an optional user-supplied buffer in the standard message format.

As illustrated in FIG. 13, the Standard Message Format (SMF) has six fields: source address, destination address, destination message port, delivery flags and services, user protocol block and optional user buffer. The user protocol block consists of 20 bytes and contains fields for protocol type, response key, response port or response status, function 1, function 2, object 1, object 2, message length, userdata 1, and userdata 2.

The protocol type field indicates whether the data at hand is a command or a response, and the protocol number. The response key is a transaction code that returns with the response to assist the caller in locating the original request. Response port is also used by the process in returning the response; in this case it is the destination message port. The function and object words are used for dispatching and are generally protocol-dependent. Message length tells the receiver the length of the message in the buffer. Note that the buffer is optional and most protocols do not send one. Finally, the user data words are a mini-buffer for sending data between processes.

Figure 14:
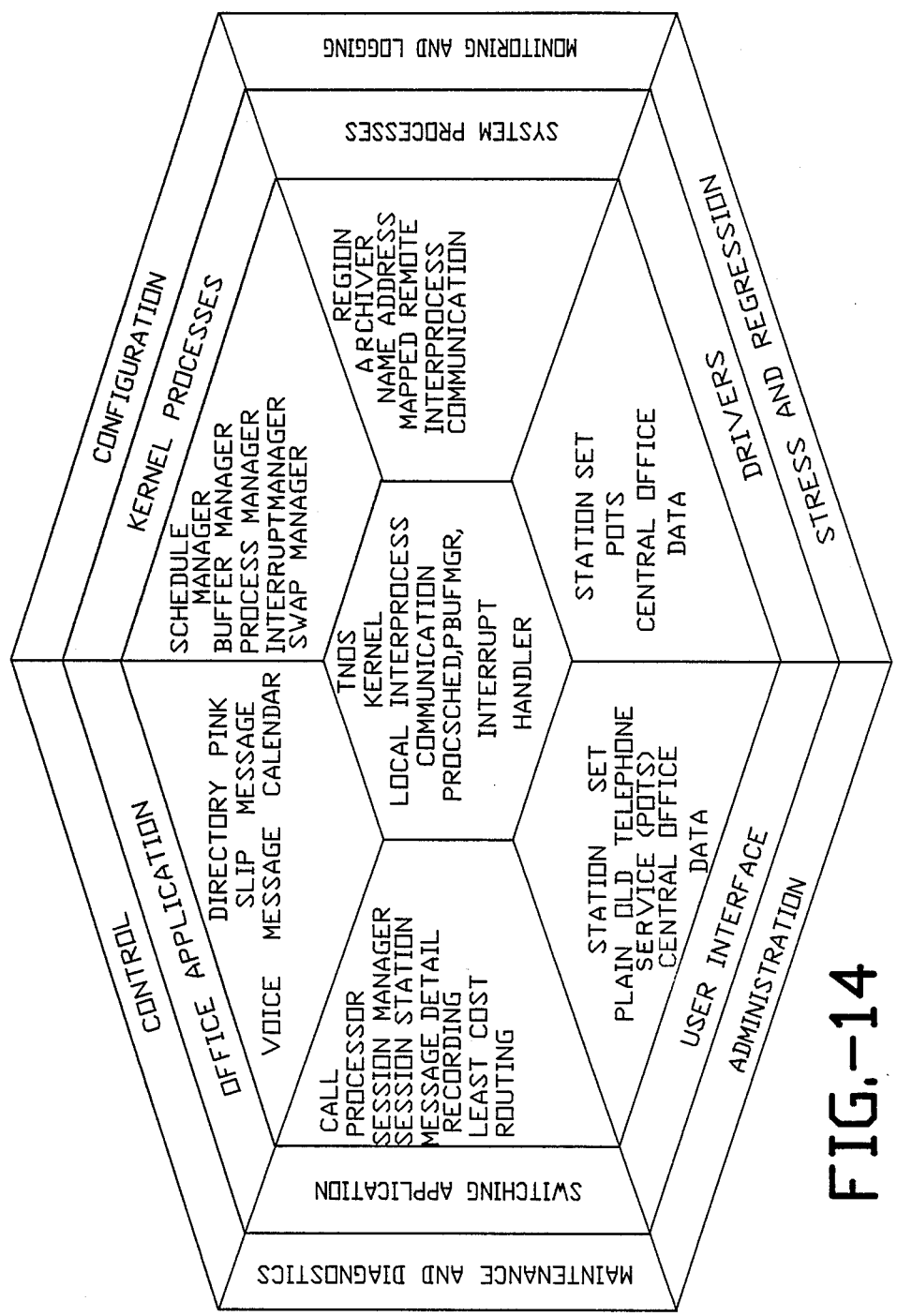
FIG. 14 depicts a block diagram illustrating the NOS architecture.

The present invention is built of a large collection of processes which follow the guidelines discussed earlier. FIG. 14 shows its software architecture decomposition. In FIG. 14, the opeating system architecture is centered around its kernel, which is written in assembler, and performs classic kernel functions. Higher level processes communicate by message passing, so special software treatment is needed. The most fundamental element is the kernel. It is very small and contains the message passing software, a basic resource control and hardware-dependent code. It is written in assembler for fastest performance. Kernel processes cover the classical elements of operating room services. These include buffer management, process management and swap management. Each of these processes has a special status because it can share memory with the kernal itself. System processes supply the higher level services, which are sent messages just like any standard application process, and receive no special treatment.

Drivers have a special place in the system because of their ability to have interrupt handlers placed in their address space and to connect and disconnect from the interrupts. Driver interrupt handlers do not handle real interrupts. They are code segments that are executed after the system interrupt handler processes the "real" interrupt.

User interface modules are the device-independent portion of the system. They are interpreter-based, multi-channel processes that perform the syntactic and some semantic processing of the user requests for service. Finally, the system contains a significant set of applications. These are grouped into two sets; those that pertain to switching and those that pertain to office productivity.

It is important to understand the NOS supports the development, test and integration of software and hardware in a unique manner. It is designed to allow the developer to take the object decomposition output and implement processes without changing its basic form. The advantage is less development time.

The development process is broken into five segments and consists of the conception stage as described above, specification state, development and unit test, integration, and monitoring logging. In the specification stage, the process of subsystem is specified by an internal specification, which is the developer'guide book, and a protocol document with external interface and operation descriptions. The protocol document or DOTPCL file, is a controlled document. Its standard form documents the specific use of the standard message form as implemented by NOS and the executing process.

During development and unit test, NOS also plays an important role. First as a host environment, processes can be brought into a subset runable system and use the runtime resources as if they were in a complete system. Processes that do not yet exist are simulated by "message generators" which impersonate the other pieces that are still under development. Taking the notion of machine-independent operating systems literally, NOS not only runs on the module processor, but also on other types of equipment, such as the IBM PC. This feature allows each developer to test design independently and conveniently.

The design integration phase is always one of the trickiest phases in any project; NOS can assist here as well. At integration time, processes run with protection turn on, and developers have access to a debugger. Finally, this system has a common logger and monitoring subsystem that allows ongoing event tracking.

The Universal Codec Board performs a function within the system which converts analog voice signals to digital form and conversely coverts digital received signals to analog form. It s common practice now for the manufacturers of integrated circuits to produce single chips which perform these functions and meet the standards set by the Bell System, Electronic Industries Association and others. The present system incorporates these Large Scale Integrated (LSI) codec-filter IC's in the Telephone Station Set (TSS), in the Central Office Interface Unit (COIU) and in the Pair Interface Unit (PIU).

To insure availability of these devices, it is necessary to qualify multiple suppliers of the IC's. All suppliers require some outboard components which work in conjunction with the internal electronics of the IC's. Each of the suppliers require a different set of components and in some cases also require that the components be connected to different pins of the IC. It has been common practice for users of this class of IC to lay out the master (or mother) board with a combinational hole pattern so that the IC's from several manufacturers could be used. Their assembly processes are complicated by the fact that they must preselect the components and instruct the assemblers differently each time they use a different Manufacturer's IC.

The Universal Codec Board (UCB) was designed in such a way that all mother boards mentioned above could utilize a single hole pattern and each UCB would be functionally identical regardless of which supplier of the Codec-Filter IC was used. The UCB's can therefore be used interchangeably in productin and in repair with no requirement to inspect or change the outboard components. They can also be stocked in a storeroom with no regard to the actual Manufacturer of the IC. Any UCB will then plug in to any mother board.

Figure 15:
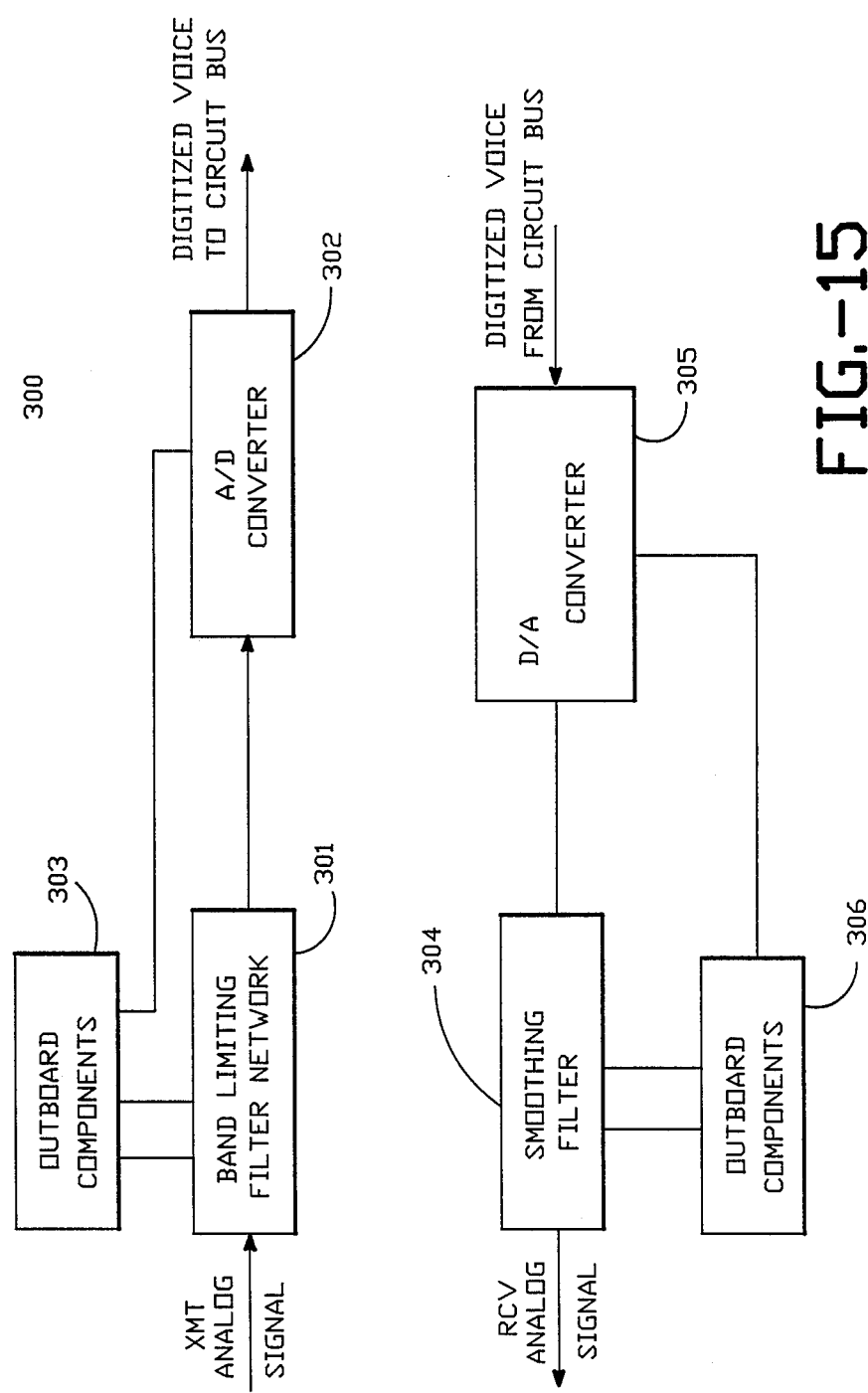
FIG. 15 depicts a block diagram of a universal codec board, which forms part of the present invention.

Referring to FIG. 15, the operation of the UCB 300 will now be described. The voice signals coming from the analog circuitry of the telephone handset or microphone are applied to the input of the IC. The IC performs band limiting on the signals to eliminate those frequencies which are not appropriate for transmission to the telephone network. The filter network 301 and the Analog to Digital converter 302 are part of the single chip IC. The outboard component section 303 is specified by the IC manufacturer and these components are assembled into the UCB adjacent to the IC. The A/D converter 302 output then sends a clocked, digitized series of voice samples to the circuit bus via the BIC, or in the case of the TSS the samples are first sent to the station link via the SLED. The outboard components allow proper operation of the IC and provide appropriate power conditioning for the IC.

Conversely, the digitized voice samples are received by the IC; changed to analog form by the D/A converter 305 and then sent to a smoothing filter 304, which removes the sampling frequency component. The smoothing filters also interact with outboard components 306 in such a way that the output meets the above mentioned standards. These outboard components also vary with the manufacturer of the IC. The components are once again accommodated by the UCB so that each UCB, regardless of the IC manufacturer, will be identical in the receive function.

Figure 16:
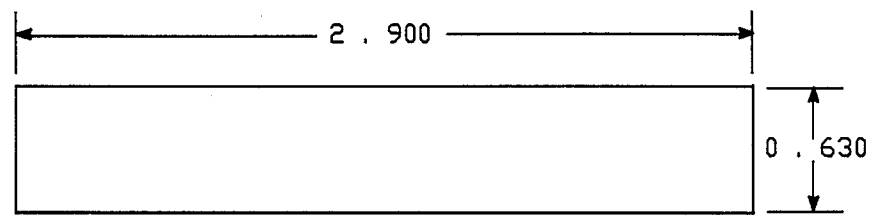
FIG. 16 depicts a fabrication outline of the UCB of FIG. 15.
Figure 18:
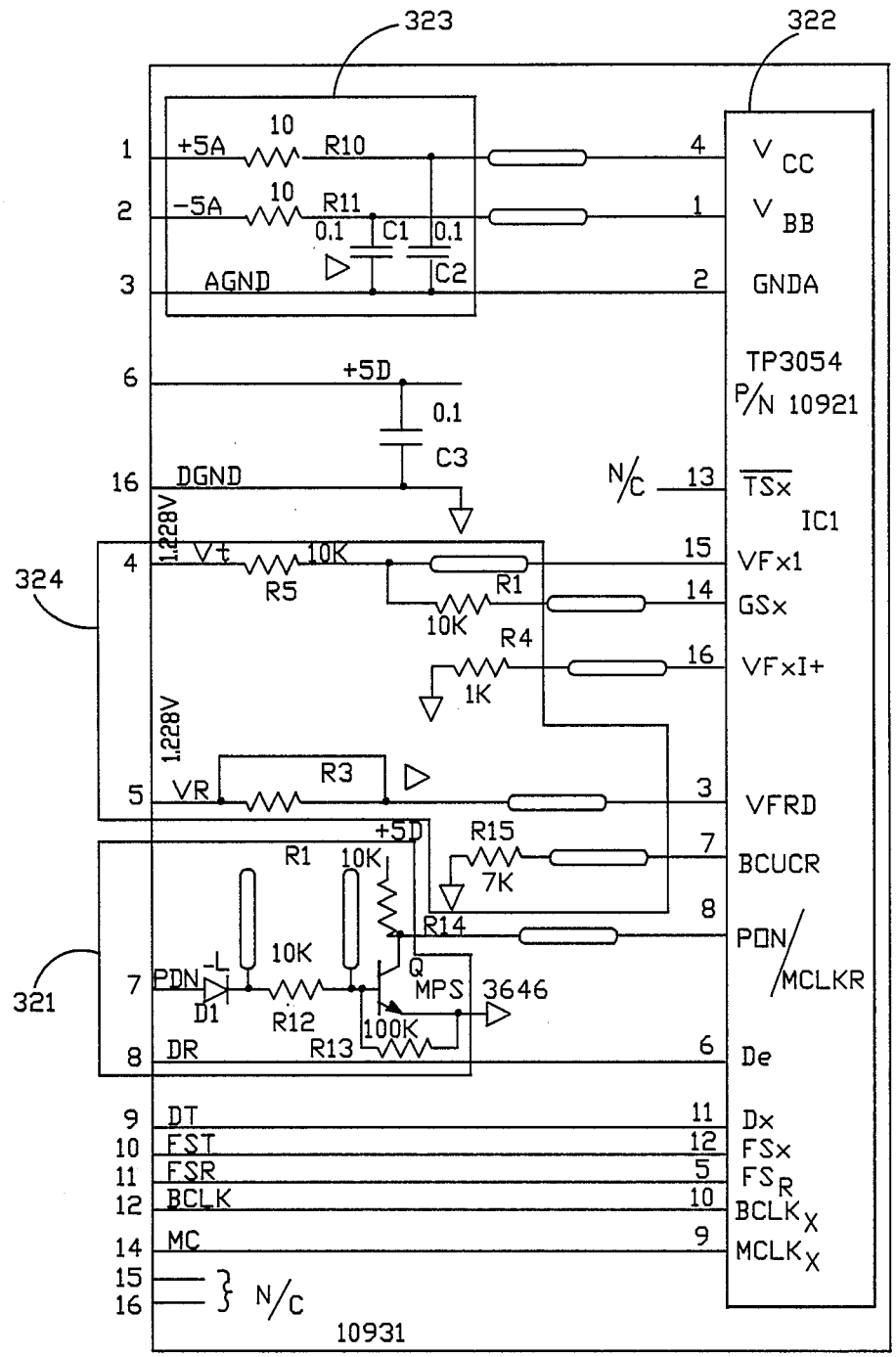
FIG. 18 depicts a schematic diagram of one UCB.

All UCB's have the identical fabrication outline for the printed circuit board. This outline is shown in FIG. 16, and is used for board manufacturing. FIG. 18 is an assembly drawing of one embodiment of the UCB which shows the IC, the circuit board 312, groups of outboard passive components 313 and 314, and transistor 315.

Figure 17:
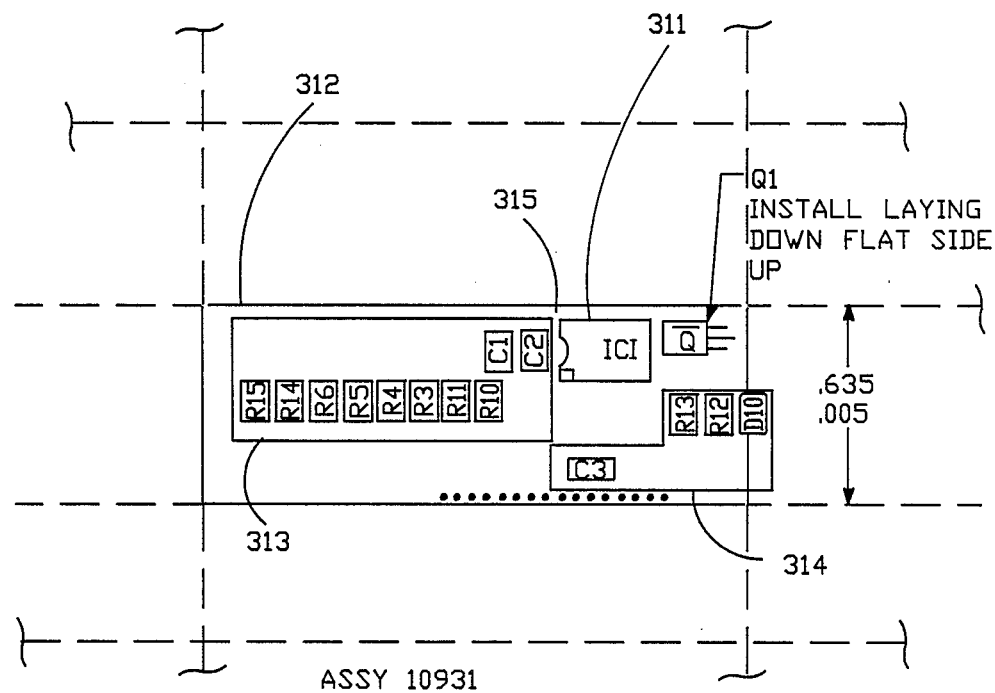
FIG. 17 depicts an assembly drawing for the UCB of FIG. 16.

The schematic diagram for the UCB version of FIG. 17 is shown in FIG. 18 and shows details of the circuit implementation. The transistor Q1 is used to buffer a clock signal for proper operation with IC 322. Transistor Q1 is installed lying down with the flat side up. The r/c networks 323 are used for filtering the 5 volt power to the IC. Other components 324 are used to allow the IC to operate according to the specific manufacturer's specifications.

Figure 19:
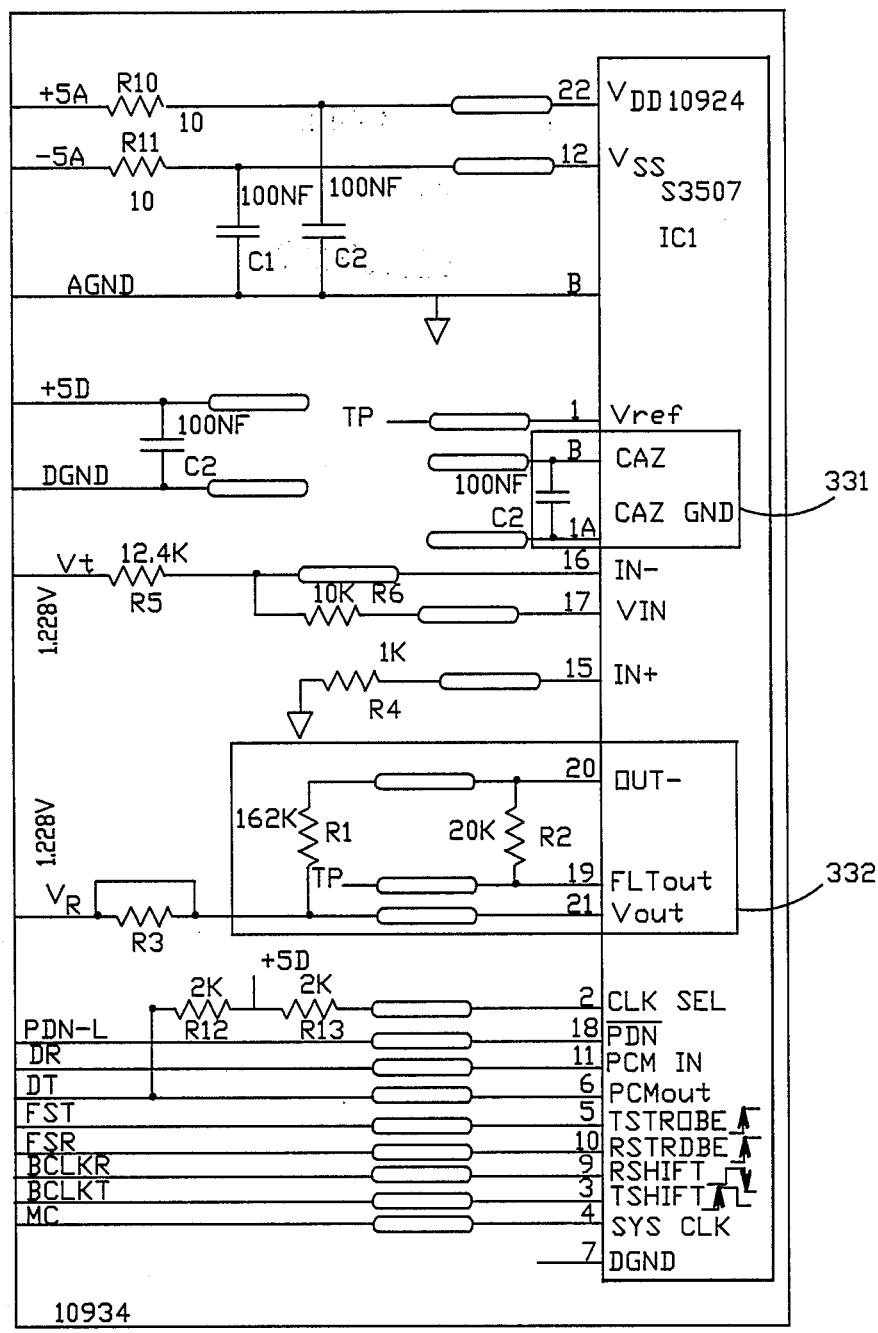
FIG. 19 depicts a schematic diagram of another UCB, different from that of FIG. 18.

A different manufacturer's IC can be employed by using the circuit shown in FIG. 20. It can be seen that the transistor Q1 which was required by the version of FIG. 19 is not required by this IC. Also the capacitor 331 is employed in this arrangement and is not required by the version of FIG. 18. The resistor network 332 used in this second version is different than that used in the first. Other versions of the UCB can be implemented.

What is claimed is:

1. A telephone station set for use in a business communication system, said telephone station set comprising means connected in common to a pair of telephone subscriber lines for transmitting and receiving simultaneous multiplexed digital voice and data information only on said subscriber lines to thereby permit simultaneous voice and data communication, softkey-selectible menu-driven display means for displaying a plurality of interactive changeable functions, means responsive to a soft key-selected one of said displayed menu functions for enabling said selected menu function, said display means including a first display portion for displaying a first line of characters identifying information and prompts relating to a particular telephone call and a second different display portion for displaying a second line of characters representative of a plurality of changeable menu functions, each of which correspond to a particular selected one of said softkey function keys during a respective stage of the particular telephone call.

2. A telephone station set for use in a business communication system, said telephone station set comprising means for interfacing with at least one data device, means connected in common to a pair of telephone subscriber lines for transmitting and receiving multiplexed voice and data information only on said same subscriber lines to thereby permit simultaneous voice and data communication, a plurality of hard function keys, a plurality of soft function keys, softkey-selectible menu-driven display means for displaying a plurality of changeable menu functions, and means responsive to a softkey-selected one of said displayed menu functions for enabling said selected menu function, said display means including a first display portion for displaying a first line of characters identifying information and prompts relating to a particular telephone call and a second different display portion for displaying a second line of character representative of a plurality of changeable menu functions, each of which correspond to a particular selected one of said softkey function keys during a respective stage of the particular telephone call.

3. A telephone station set as in claim 2 wherein said plurality or soft function keys number at least five.

4. A telephone station set as in claim 2, wherein said plurality of hard key functions include a help key.

5. A telephone station set as in claim 4 including means responsive to the selection of said help key for displaying messages on said display means to assist in the enabling of said selected menu function.

6. A business communication system comprising
a plurality of digital telephone station sets where each of said station sets include means connected in common to a pair of telephone subscriber lines for transmitting and receiving digital voice and data information only on said same subscriber lines,
circuit bus means,
transactin packet bus means,
station interface unit means for interfacing said telephone sets to said transaction packet bus means and to said circuit bus means to enable transmission and reception of digital voice and data information,
one or more data devices wherein said station sets include means for interfacing with said one or more data devices to thereby permit simultaneous voice and data communication,
data interface unit means for interfacing said one or more data devices to said circuit means and to said transaction packet bus means,
central office interface unti means for interfacing between said transaction packet bus means and said circuit bus means and with telephone system central office lines, and
central processor means connected to said transaction packet bus means and siad circuit bus means for controlling said station sets and said data devices such that said data devices and said station sets operate independently of one another, wherein said telephone station sets each include
softkey-selectible menu-driven display means for displaying a plurality of changeable menu functions, and
means responsive to a softkey-selected one of said displayed menu functions for enabling said selected menu function, said display means including a first display portion for displaying a first line of characters identifying information and prompts relating to a particular telephone call and a second different display portion for displaying a second line of characters representative of a plurality of changeable menu functions, each of which correspond to a particular selected one of said softkey function keys during a respective stage of the particular telephone call.

7. A system as in claim 6 including bus interface chip means for interfacing said interface unit to said circuit bus means.

8. A system as in claim 6 including station link encoder/decoder means for interfacing said telephone station sets to said interface units.

9. A system as in claim 8 including universal codec board means for encoding and decoding data between analog and digital formats.

10. A telephone station set comprising
means for interfacing with at least one data device,
means connected in common to a pair of telephone subscriber lines for transmitting and receiving multiplexed voice and data information only on said same subscriber lines to thereby permit simultaneous voice and data communication,
softkey-selectible menu-driven display means for displaying a plurality of interactive changeable menu functions, and
means responsive to a softkey-selected one of said displayed menu functions for enabling said selected menu function, said display means including a first display portion for displaying a first line of characters identifying information and prompts relating to a particular telephone call and a second different display portion for displaying a second line of characters representative of a plurality of changeable menu functions, each of which correspond to a particular selected one of said softkey function keys during a respective stage of the particular telephone call.

11. A telephone station set comprising
means for interfacing with at least one data device,
means connected in common to a pair of telephone subscriber lines for transmitting and receiving multiplexed voice and data information only on said same subscriber lines to thereby permit simultaneous voice and data communication,
a plurality of hard function keys,
a plurality of soft function keys,
softkey-selectible menu-driven display means for displaying a plurality of changeable menu functions, and
means responsive to a softkey-selected one of said displayed menu functions for enabling said selected menu function, said display means including a first display portion for displaying a first line of charactes identifying information and prompts relating to a particular telephone call and a second different display portion for displaying a second line of characters representative of a plurality of changeable menu functions, each of which correspond to a particular selected one of said softkey function keys during a respective stage of the particular telephone call.

12. A telephone station set as in claim 11 including processor means for managing communications protocol, said display means, and said hard function and soft function keys.

13. A system as in claim 9 wherein each of said digital telephone station sets include processor means for managing communications protocol, said display means and for managing data transmission between said central processor means and said circuit bus means.

14. A telephone station set comprising
a plurality of hard function keys,
a plurality of soft function keys,
softkey-selectible menu-driven display means for displaying a plurality of changeable menu fucntions,
means responsive to a softkey-selected one of said displayed menu functions for enabling said selected menu function, said display means including a first diplay portion for displaying a first line of characters changeable identifying information and prompts relating to a particular telephone call and a second different display portion for displaying a second line of characters representative of a plurality of changeable menu functions, each of which correspond to a particular selected one of said softkey function keys during a respective stage of the particular telephone call.

* * * * *